US012683295B2

(12) United States Patent
Hong et al.

(10) Patent No.: US 12,683,295 B2
(45) Date of Patent: Jul. 14, 2026

(54) ELECTRONIC DEVICE COMPRISING ANTENNA

(71) Applicants: Samsung Electronics Co., Ltd., Suwon-si (KR); POSTECH RESEARCH AND BUSINESS DEVELOPMENT FOUNDATION, Pohang-si (KR)

(72) Inventors: Wonbin Hong, Pohang-si (KR); Sumin Yun, Suwon-si (KR); Jaehoon Jo, Suwon-si (KR); Dongkwon Choi, Pohang-si (KR); Hosaeng Kim, Suwon-si (KR)

(73) Assignees: Samsung Electronics Co., Ltd., Suwon-si (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 87 days.

(21) Appl. No.: 18/507,641

(22) Filed: Nov. 13, 2023

(65) Prior Publication Data

US 2024/0088575 A1 Mar. 14, 2024

Related U.S. Application Data

(63) Continuation of application No. PCT/KR2022/006937, filed on May 13, 2022.

(30) Foreign Application Priority Data

May 13, 2021 (KR) ........................ 10-2021-0062047

(51) Int. Cl.
*H01Q 21/28* (2006.01)
*H01Q 1/24* (2006.01)
(Continued)

(52) U.S. Cl.
CPC ............. *H01Q 21/28* (2013.01); *H01Q 1/243* (2013.01); *H01Q 1/38* (2013.01); *H01Q 3/30* (2013.01)

(58) Field of Classification Search
CPC ............ H01Q 1/243; H01Q 1/38; H01Q 1/46; H01Q 3/24; H01Q 3/26; H01Q 3/30; H01Q 19/32; H01Q 21/205; H01Q 21/28
See application file for complete search history.

(56) References Cited

U.S. PATENT DOCUMENTS 5,784,032 A * 7/1998 Johnston .................. H01Q 7/00 343/702
6,356,242 B1 * 3/2002 Ploussios ................. H01Q 9/42 343/846
(Continued)

FOREIGN PATENT DOCUMENTS

JP 2002-171110 A 6/2002
JP 4361501 B2 11/2009
(Continued)

OTHER PUBLICATIONS

Extended European Search Report dated Sep. 2, 2024, issued in European Patent Application No. 22807906.7.
(Continued)

*Primary Examiner* — Alexander H Taningco
(74) *Attorney, Agent, or Firm* — Jefferson IP Law, LLP

(57) ABSTRACT

An electronic device is provided. The electronic device includes a wireless communication circuit, a plurality of antennas, and a processor, a first antenna including a first conductive portion, a second conductive portion, a third conductive portion, a first conductive stub including a first portion extending in a direction parallel to a printed circuit board (PCB) with the third conductive portion at a first end of the third conductive portion contacting a first conductive portion and a portion bending at one end of the first portion
(Continued)

and extending to a third point of the PCB, and a second conductive stub including a second portion extending in a direction parallel to the PCB with the third conductive portion at a second end of the third conductive portion contacting a second conductive portion and a portion bending at one end of the second portion and extending to a fourth point of the PCB.

20 Claims, 17 Drawing Sheets

(51) Int. Cl.
*H01Q 1/38* (2006.01)
*H01Q 3/30* (2006.01)

(56) References Cited

U.S. PATENT DOCUMENTS

| | | | | |
|---|---|---|---|---|
| 10,784,566 | B1 | 9/2020 | Chang et al. | |
| 10,797,403 | B2 * | 10/2020 | Adams | H01Q 5/48 |
| 2002/0065118 | A1 | 5/2002 | Chiba et al. | |
| 2007/0229376 | A1 * | 10/2007 | Desclos | H01Q 1/273 343/718 |
| 2010/0045557 | A1 | 2/2010 | Park et al. | |
| 2010/0238087 | A1 | 9/2010 | Jung et al. | |
| 2010/0289705 | A1 * | 11/2010 | Shtrom | H01Q 1/38 343/702 |
| 2017/0244163 | A1 | 8/2017 | Yoo et al. | |
| 2019/0131722 | A1 | 5/2019 | Ryu et al. | |
| 2019/0334252 | A1 | 10/2019 | Adams et al. | |
| 2019/0363426 | A1 | 11/2019 | Su | |
| 2022/0159826 | A1 | 5/2022 | Yun et al. | |
| 2022/0173525 | A1 * | 6/2022 | Jia | H01Q 21/065 |

FOREIGN PATENT DOCUMENTS

| | | | |
|---|---|---|---|
| JP | 4924586 | B2 | 4/2012 |
| JP | 6624020 | B2 | 12/2019 |
| KR | 10-2010-0022374 | A | 3/2010 |
| KR | 10-1043764 | B1 | 6/2011 |
| KR | 10-2011-0009179 | U | 9/2011 |
| KR | 10-1274250 | B1 | 6/2013 |
| KR | 10-2017-0098107 | A | 8/2017 |
| KR | 10-1809383 | B1 | 12/2017 |
| KR | 10-2019-0105846 | A | 9/2019 |
| KR | 20190105846 | A * | 9/2019 |
| KR | 10-2020-0112224 | A | 10/2020 |
| WO | 03-058762 | A1 | 7/2003 |

OTHER PUBLICATIONS

International Search Report dated Sep. 8, 2022, issued in International Patent Application No. PCT/KR2022/006937.
Kim et al., A multiple beam management scheme on 5G mobile communication systems for supporting high mobility.
Quantitative analysis of the effects of polarization and pattern reconfiguration for mmWave 5G mobile antenna prototypes.
Samsung develops 60GHz Wi-Fi 802.11ad technology with five times data transmission speed, Oct. 12, 2014.
Hong et al., Study and prototyping of practically large-scale mmWave antenna systems for 5G cellular devices.
Hong et al., Quantitative analysis of the effects of polarization and pattern reconfiguration for mmWave 5G mobile antenna prototypes.
Pandey, Design of a compact high power phased array for 5G FD-MIMO system at 29 GHZ, Proceedings of the Asia-Pacific Microwave Conference 2016.
Selvam et al., Novel Frequency-and Pattern-Reconfigurable Rhombic Patch Antenna With Switchable Polarization.
Yan et al., A Novel Pattern-Reconfigurable Grid Array Antenna, Dec. 25, 2018.
Rodrigo et al., Pixel reconfigurable antennas: Towards low-complexity full reconfiguration.
Korean Office Action dated Jul. 15, 2025, issued in Korean Application No. 10-2021-0062047.
Notice of Final Rejection dated May 21, 2026, issued in Korean Application No. 10-2021-0062047.

* cited by examiner

ELECTRONIC DEVICE COMPRISING ANTENNA

CROSS-REFERENCE TO RELATED APPLICATION(S)

This application is a continuation application, claiming priority under § 365(c), of an International application No. PCT/KR2022/006937, filed on May 13, 2022, which is based on and claims the benefit of a Korean patent application number 10-2021-0062047, filed on May 13, 2021, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) POSTECH RESEARCH AND BUSINESS DEVELOPMENT FOUNDATION.

BACKGROUND

1. Field

The disclosure relates to an electronic device including an antenna.

2. Description of Related Art

An electronic device may provide wireless communication in various frequency bands. In addition, the electronic device may include an antenna device for transmitting and receiving signals of a high frequency band in an environment where massive data (e.g., dynamic images) are transmitted and received.

Meanwhile, if the electronic device transmits and receives a signal of the high frequency band, a beam forming scheme may be used or a radiation direction may be adjusted to improve wireless communication efficiency by improving directivity.

The above information is presented as background information only to assist with an understanding of the disclosure. No determination has been made, and no assertion is made, as to whether any of the above might be applicable as prior art with regard to the disclosure.

SUMMARY

If active elements are included to implement various radiation patterns and polarizations, an antenna module configuration included in an electronic device gets complicated, and a manufacturing cost of the antenna module increases depending on the number and types of the active elements. Alternatively, it is difficult to implement various radiation patterns even if the antenna module uses the active element.

Aspects the disclosure are to address at least the above-mentioned problems and/or disadvantages and to provide at least the advantages described below. Accordingly, an aspect of the disclosure is to provide an electronic device for implementing various radiation patterns through an antenna without using the active element.

Additional aspects will be set forth in part in the description which follows and, in part, will be apparent from the description, or may be learned by practice of the presented embodiments.

In accordance with an aspect of the disclosure, an electronic device is provided. The electronic device includes a printed circuit board, a wireless communication circuit disposed on the printed circuit board, a plurality of antennas, and at least one processor electrically connected to the wireless communication circuit and the plurality of the antennas, a first antenna among the plurality of the antennas includes a first conductive portion extending from a first point of the printed circuit board to face a first direction perpendicular to a first surface of the printed circuit board, a second conductive portion extending from a second point of the printed circuit board to face the first direction, a third conductive portion parallel to the printed circuit board, a first conductive stub including a first portion extending in a direction parallel to the printed circuit board at a designated angle with the third conductive portion at a first end of the third conductive portion contacting a first conductive portion and a portion bending at one end of the first portion and extending to a third point of the printed circuit board, and a second conductive stub including a second portion extending in a direction parallel to the printed circuit board at a designated angle with the third conductive portion at a second end of the third conductive portion contacting a second conductive portion and a portion bending at one end of the second portion and extending to a fourth point of the printed circuit board, the third conductive portion is electrically connected to the first conductive portion and the second conductive portion, and the wireless communication circuit supplies power to the first antenna through at least one point of the first point or the second point of the printed circuit board.

In accordance with another aspect of the disclosure, an electronic device is provided. The electronic device includes a printed circuit board, a wireless communication circuit disposed on the printed circuit board, a plurality of antennas, and at least one processor electrically connected to the wireless communication circuit and the plurality of the antennas, a first antenna among the plurality of the antennas includes a first conductive stub extending from a first point of the printed circuit board to face a first direction perpendicular to a first surface of the printed circuit board, a second conductive stub extending from a second point of the printed circuit board to face the first direction, a third conductive portion parallel to the printed circuit board, a first conductive stub including a first portion extending in a direction parallel to the printed circuit board at a designated angle with the third conductive portion at a first end of the third conductive portion contacting a first conductive portion and a portion bending at one end of the first portion and extending to a third point of the printed circuit board, and a second conductive stub including a second portion extending in a direction parallel to the printed circuit board at a designated angle with the third conductive portion at a second end of the third conductive portion contacting a second conductive portion and a portion bending at one end of the second portion and extending to a fourth point of the printed circuit board, the third conductive portion is electrically connected to the first conductive stub and the second conductive stub, and the wireless communication circuit supplies power to the first antenna through at least one point of the third point or the fourth point of the printed circuit board.

In accordance with another aspect of the disclosure, an electronic device is provided. The electronic device includes a printed circuit board, a wireless communication circuit disposed on the printed circuit board, a plurality of antennas including a first antenna, a second antenna, a third antenna, and a fourth antenna, and at least one processor electrically connected to the wireless communication circuit and the plurality of the antennas, the first antenna and the second antenna is symmetric based on a virtual first axis, the third antenna and the fourth antenna is symmetric based on a virtual second axis which is perpendicular to the first axis, the first antenna among the plurality of the antennas includes a first conductive portion extending from a first point of the printed circuit board to face a first direction perpendicular to a first surface of the printed circuit board, a second conductive portion extending from a second point of the printed circuit board to face the first direction, a third conductive portion parallel to the printed circuit board, a first conductive stub including a first portion extending in a direction parallel to the printed circuit board at a designated angle with the third conductive portion at a first end of the third conductive portion contacting a first conductive portion and a portion bending at one end of the first portion and extending to a third point of the printed circuit board, and a second conductive stub including a second portion extending in a direction parallel to the printed circuit board at a designated angle with the third conductive portion at a second end of the third conductive portion contacting a second conductive portion and a portion bending at one end of the second portion and extending to a fourth point of the printed circuit board, the third conductive portion is electrically connected to the first conductive portion and the second conductive portion, the second antenna, the third antenna, and the fourth antenna is formed in the same structure as the first antenna, and the wireless communication circuit supplies power to at least one antenna of the first antenna, the second antenna, the third antenna, and the fourth antenna through at least one point of the first point or the second point of the printed circuit board.

According to various embodiments of the disclosure, an electronic device provides an apparatus and a method for implementing various radiation patterns through an antenna without using an active element.

Besides, various effects obtained directly or indirectly through this document is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
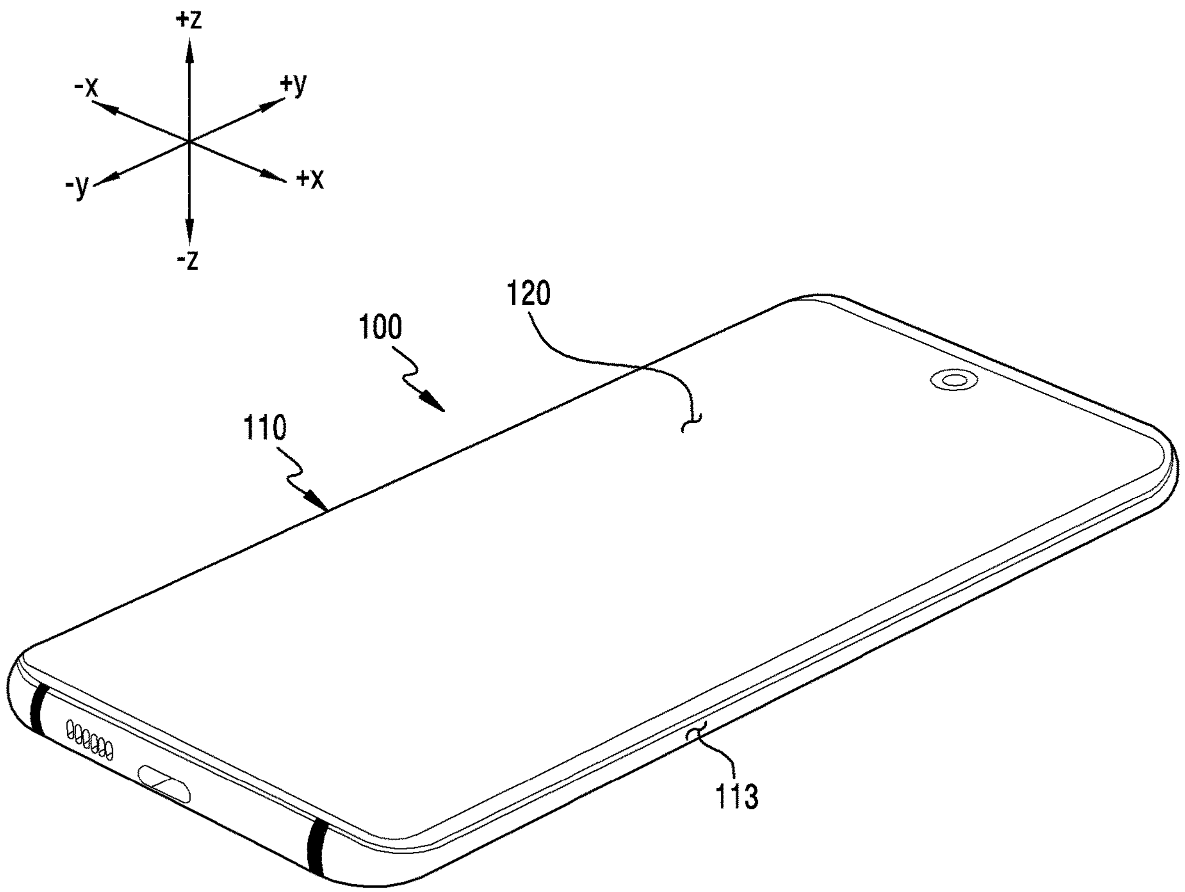
FIG. 1A is a perspective view of a front surface of an electronic device according to an embodiment of the disclosure.
Figure 1B:
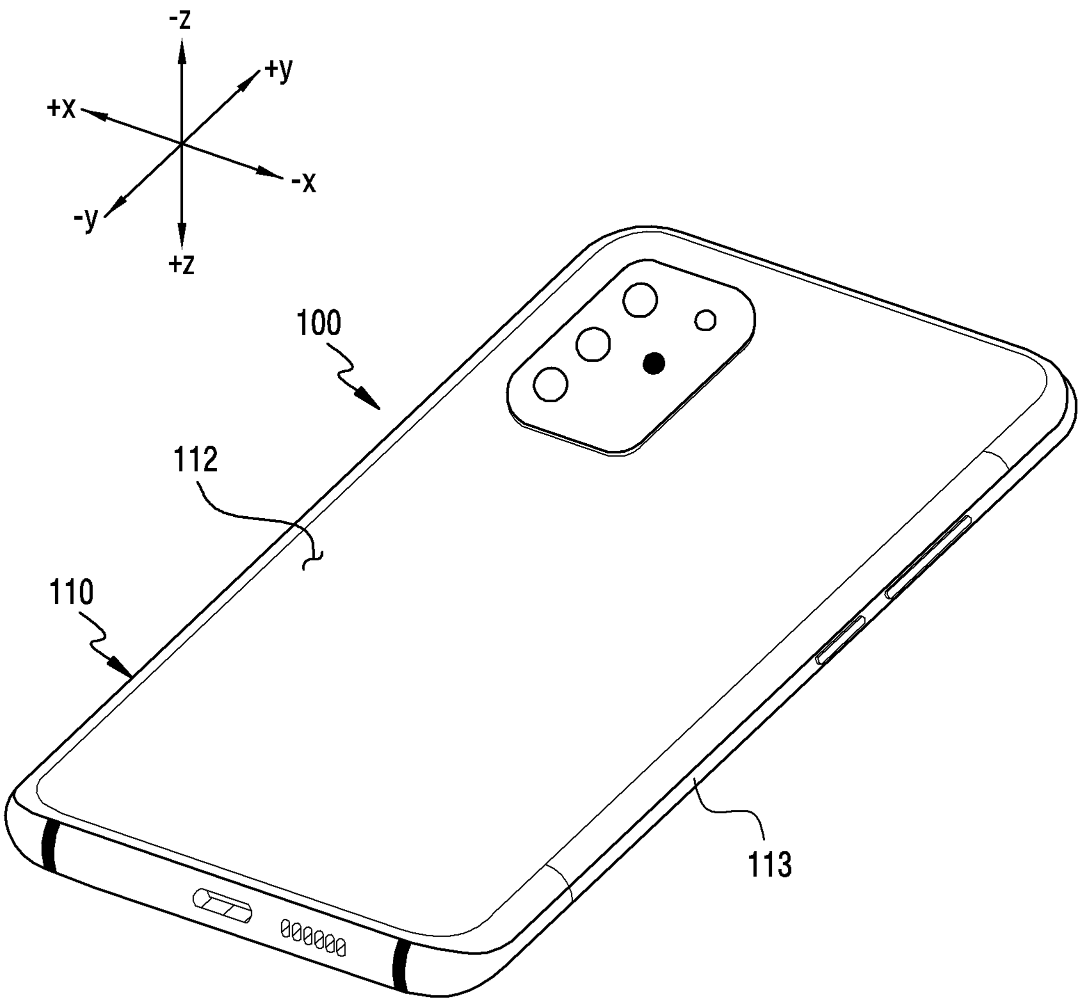
FIG. 1B is a perspective view of a rear surface of an electronic device according to an embodiment of the disclosure.

FIG. 1A is a perspective view of a front surface of an electronic device 100 (e.g., a surface positioned in the +z direction of the electronic device 100 of FIG. 1A) according to an embodiment of the disclosure. FIG. 1B is a perspective view of a rear surface of the electronic device 100 (e.g., a surface positioned in the −z direction of the electronic device 100 of FIG. 1B) according to an embodiment of the disclosure.

Referring to FIGS. 1A and 1B, the electronic device 100 may include a housing 110, and the housing 110 may include a front plate 111, a rear plate 112, and a side member 113 surrounding a space between the front plate 111 and the rear plates 112.

In an embodiment of the disclosure, a display 120 may be disposed on the front plate 111 of the housing 110. In an example, the display 120 may occupy most of the front surface of the electronic device 100 (e.g., a surface positioned in the +z direction of the electronic device 100 of FIG. 1A).

According to an embodiment of the disclosure, the rear plate 112 may be formed of coated or colored glass, ceramic, polymer, metal (e.g., aluminum, stainless steel (STS), or magnesium), or a combination of at least two of those materials. According to an embodiment of the disclosure, the rear plate 112 may include a curved portion which bends toward the side member 113 from least at one end and extends seamlessly.

According to an embodiment of the disclosure, the side member 113 may be coupled with the rear plate 112, and may include metal and/or polymer. According to an embodiment of the disclosure, the rear plate 112 and the side member 113 may be integrally formed and may include the same material (e.g., a metal material such as aluminum).

According to an embodiment of the disclosure, a conductive portion of the side member 113 may be electrically connected to a wireless communication circuit to serve as an antenna radiator which transmits and/or receives a radio frequency (RF) signal of a designated frequency band. According to an embodiment of the disclosure, the wireless communication circuit may transmit an RF signal of a designated frequency band to the conductive portion of the side member 113 or receive an RF signal of a designated frequency band from the conductive portion.

The electronic device 100 shown in FIGS. 1A and 1B corresponds to one example, and does not limit a device type to which the technical idea disclosed in this document is applied. The technical idea disclosed in this document may be applied to various user devices including a part which may operate as the antenna radiator. For example, the technical idea disclosed in this document may be applied to a foldable electronic device for horizontally or vertically folding, by employing a flexible display and a hinge structure, a tablet or a laptop computer.

Hereinafter, various embodiments shall be described based on the electronic device 100 shown in FIGS. 1A and 1B for the sake of explanation.

Figure 2:
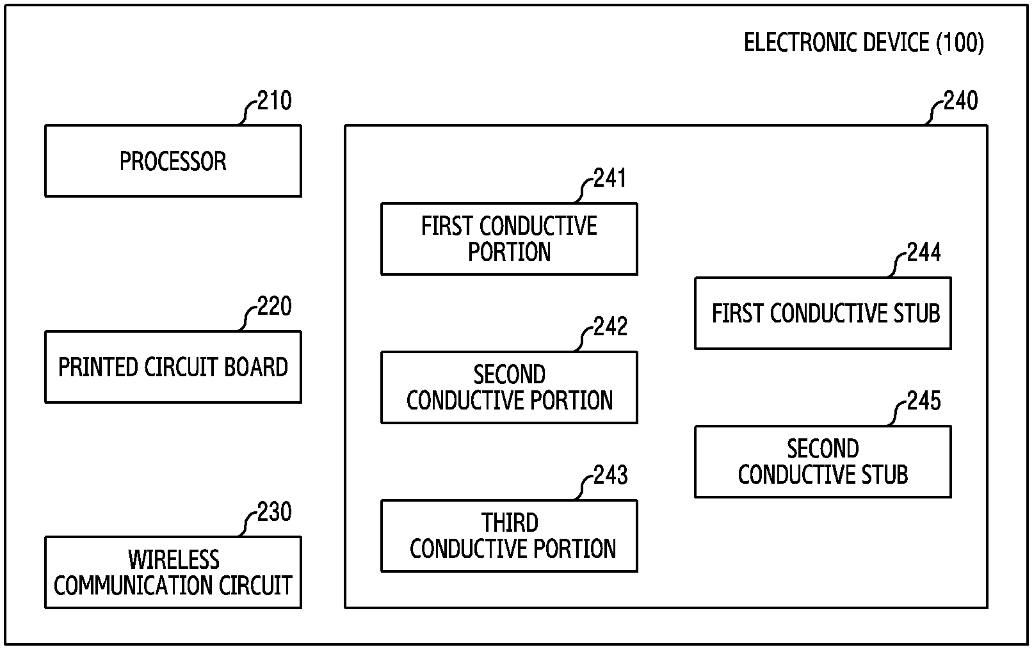
FIG. 2 illustrates a hardware configuration of an electronic device according to an embodiment of the disclosure.

FIG. 2 illustrates a hardware configuration of an electronic device according to an embodiment of the disclosure.

Referring to FIG. 2, the electronic device 100 may include at least one processor 210, a printed circuit board (PCB) 220, a wireless communication circuit 230, or a first antenna 240.

According to an embodiment of the disclosure, the at least one processor 210 may be electrically connected to the wireless communication circuit 230, or the first antenna 240. In an example, the at least one processor 210 may obtain a signal received by the first antenna 240 through the wireless communication circuit 230.

According to an embodiment of the disclosure, the electronic device 100 may further include other component than the at least one processor 210, the PCB 220, the wireless communication circuit 230, and the first antenna 240. For example, the electronic device 100 may further include a second antenna, a third antenna, and/or a fourth antenna.

According to an embodiment of the disclosure, the wireless communication circuit 230 may be disposed in the PCB 220. For example, the wireless communication circuit 230 may be formed on the PCB 220.

According to an embodiment of the disclosure, the first antenna 240 may include a first conductive portion 241, a second conductive portion 242, a third conductive portion 243, a first conductive stub 244, and a second conductive stubs 245. In an example, first conductive portion 241, the second conductive portion 242, the third conductive portion 243, the first conductive stub 244, and the second conductive stub 245 may be electrically connected.

Figure 3:
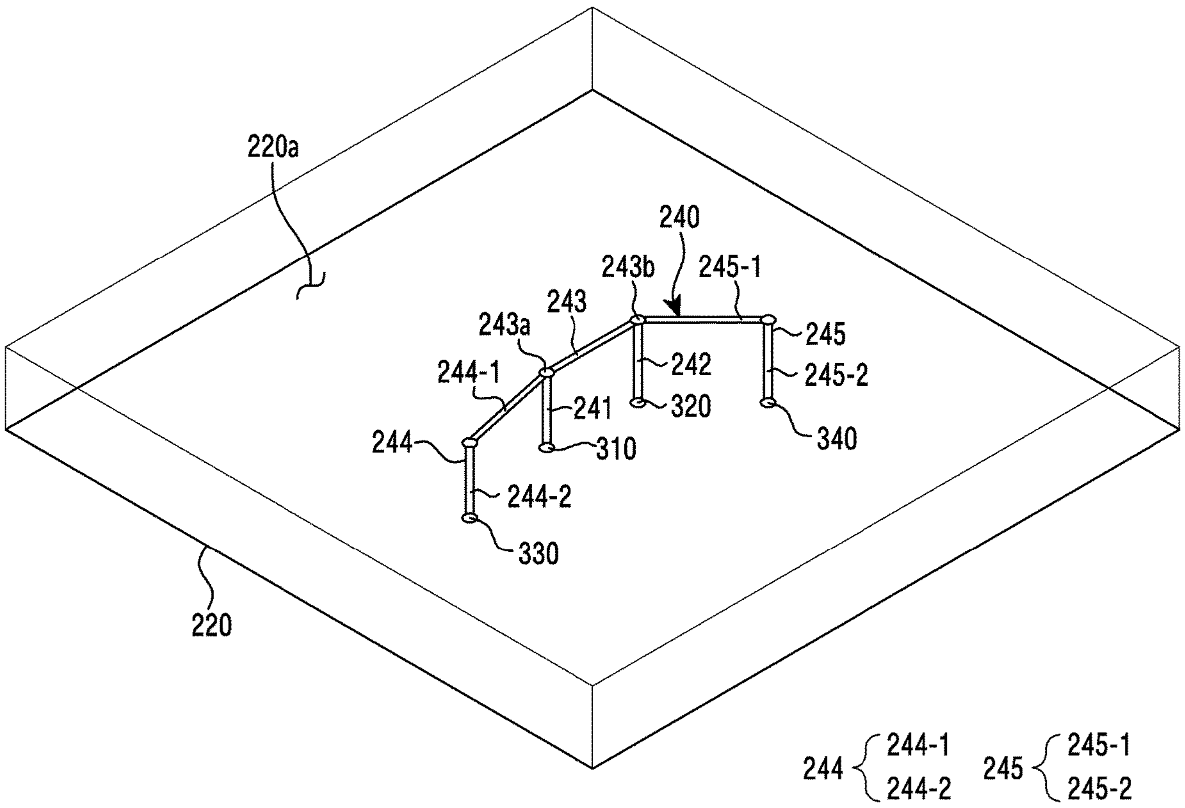
FIG. 3 illustrates a first antenna according to an embodiment of the disclosure.

FIG. 3 illustrates a first antenna according to an embodiment of the disclosure.

Referring to FIG. 3, the first antenna 240 may include a first conductive portion 241, a second conductive portion 242, a third conductive portion 243, a first conductive stub 244, or a second conductive stub 245.

According to an embodiment of the disclosure, the first antenna 240 may be disposed in the PCB 220. In an example, at least a part of the first antenna 240 may be disposed on a first surface **220*a* of the PCB 220 (e.g., a surface where the PCB 220 and the first antenna 240** contact).

According to an embodiment of the disclosure, the first antenna 240 may be electrically connected to other configuration of the electronic device 100 through the PCB 220. For example, the first antenna 240 may be electrically connected to the wireless communication circuit 230 disposed on the PCB 220. In an example, at least a part of the first antenna 240 may be formed as a conductive wire formed of a conductive material or a pattern of the PCB 220.

According to an embodiment of the disclosure, the first conductive portion 241 may be formed by extending in a direction substantially perpendicular to a first surface **220*a* (e.g., a surface where the PCB 220 and the first antenna 240 contact) of the PCB 220 at a first point 310 of the PCB 220. In an example, the first conductive portion 241 may be formed as a via, a conductive wire filled with a conductive material or a pattern of the PCB 220. In an embodiment of the disclosure, at least a part of the first conductive portion 241 may be formed inside the PCB 220**.

According to an embodiment of the disclosure, the second conductive portion 242 may be formed by extending in a direction perpendicular to the first antenna 240 (e.g., a surface where the PCB 220 and the first antenna 240 contact) of the PCB 220 at a second point 320 of the PCB 220. In an example, the second conductive portion 242 may be formed as a via, a conductive wire formed of a conductive material or a pattern of the PCB 220. In an embodiment of the disclosure, at least a part of the second conductive portion 242 may be formed inside the PCB 220. According to an embodiment of the disclosure, the third conductive portion 243 may be formed on the first surface **220*a* of the PCB 220. In an example, the third conductive portion 243 may be formed as a conductive wire filled with a conductive material of a pattern of the PCB 220. In an embodiment of the disclosure, a first end 243***a* of the third conductive portion 243 may be connected to the first conductive portion 241. As another example, a second end 243*b* of the third conductive portion 243 may be connected to the second conductive portion 242.

According to an embodiment of the disclosure, the first conductive stub 244 may include a first portion 244-1 extending in a direction parallel to the first surface 220*a* at a designated angle (e.g., about 45 degrees) with the third conductive portion 243 at the first end 243*a* of the third conductive portion 243 in contract with the first conductive portion 241 and a third portion 244-2 bending (or, bending at a right angle) at one end of the first portion 244-1 and extending to a third point 330 of the PCB. In an example, the third portion 244-2 of the first conductive stub 244 may be substantially perpendicular to the first surface 220*a* of the PCB 220. In an example, the first portion 244-1 may be formed on the first surface 220*a* of the PCB 220, and the second portion 244-2 may be formed inside the PCB 220.

According to an embodiment of the disclosure, the second conductive stub 245 may include a third portion 245-1 extending in a direction parallel to the first surface 220*a* at a designated angle (e.g., about 45 degrees) with the third conductive portion 243 at the second end 243*b* of the third conductive portion 243 in contract with the second conductive portion 242 and a fourth portion 245-2 bending at one end of the second portion and extending to a fourth point 340 of the PCB. In an example, the fourth portion 244-2 of the second conductive stub 245 may be substantially perpendicular to the first surface 220*a* of the PCB 220. In an example, the third portion 245-1 may be formed on the first surface 220*a* of the PCB 220, and the fourth portion 245-2 may be formed inside the PCB 220.

According to an embodiment of the disclosure, the first antenna 240 may be electrically connected to the wireless communication circuit 230 through at least one of the first conductive portion 241, the second conductive portion 242, the second portion 244-2 of the first conductive stub 244 or the fourth portion 245-2 of the second conductive stub 245. For example, power may be fed to the first antenna 240 through at least one of the first conductive portion 241, the second conductive portion 242, the second portion 244-2 of the first conductive stub 244 or the fourth portion 245-2 of the second conductive stub 245.

Figure 4:
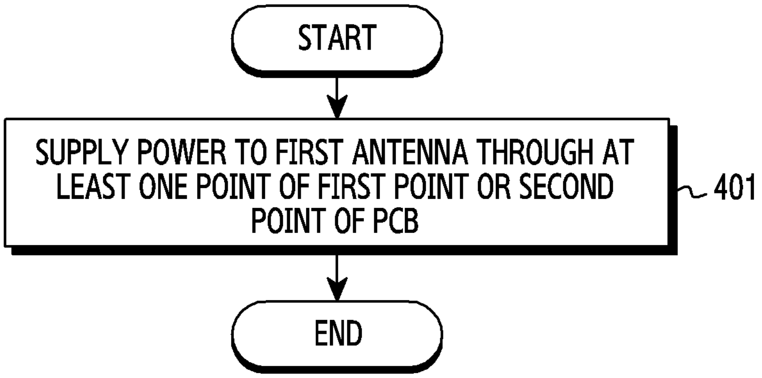
FIG. 4 is an operational flowchart of an electronic device according to an embodiment of the disclosure.

FIG. 4 is an operational flowchart of an electronic device according to an embodiment of the disclosure.

Referring to FIG. 4, the wireless communication circuit 230 may supply power to the first antenna 240 through at least one of the first point 310 or the second point 320 of the PCB 220, in operation 401.

According to an embodiment of the disclosure, the wireless communication circuit 230 may supply power to the first antenna 240 through at least one point of the first point 310 or the second point 320. In an example, the wireless communication circuit 230 may supply the power to the first antenna 240, by feeding the power to the first conductive portion 241 through the first point 310. As an example, the wireless communication circuit 230 may supply the power to the first antenna 240, by feeding the power to the second conductive portion 242 through the second point 320.

According to an embodiment of the disclosure, the wireless communication circuit 230 may supply the power to the first antenna 240 through the first point 310 and the second point 320. In an example, the wireless communication circuitry 230 may supply the power to the first antenna 240 by feeding the power to the first conductive portion 241 through the first point 310 and feeding the power to the second conductive portion 242 through the second point 320.

Figure 5:
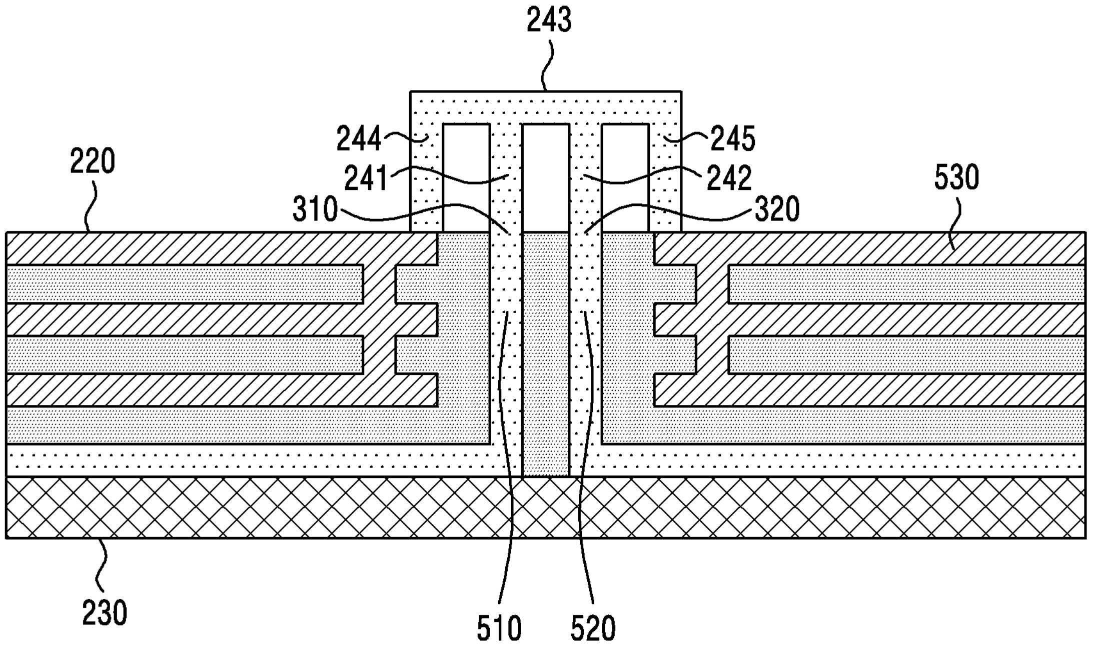
FIG. 5 illustrates a first antenna fed at a first point according to an embodiment of the disclosure.

FIG. 5 illustrates a first antenna fed at a first point according to an embodiment of the disclosure.

Referring to FIG. 5, the wireless communication circuit 230 (e.g., a radio frequency integrated circuit (RFIC) and/or intermediate frequency integrated circuit (IFIC)) may supply power to the first point 310 through a first electrical path 510. In an embodiment of the disclosure, the wireless communication circuit 230 (e.g., the RFIC) may supply power to the second point 320 through a second electrical path 520. In an example, the first electrical path 510 may include at least a part of a path of the wireless communication circuit (e.g., the wireless communication circuit 230 of FIG. 2). In an example, the second electrical path 520 may include at least a part of the path of wireless communication circuit.

According to an embodiment of the disclosure, the wireless communication circuit 230 may supply power to the first conductive portion 241 through the first point 310, and at least one processor (not shown) may adjust a magnitude and a phase of the current fed to the first point 310 through the first electrical path 510. In an example, at least one processor (not shown) may control the wireless communication circuit 230 to supply the current having the phase of 0 degree to the first point 310.

According to an embodiment of the disclosure, the PCB 220 may include a plurality of conductive layers 530. In an example, the plurality of the conductive layers 530 may be connected by conductive vias.

According to an embodiment of the disclosure, the first conductive stub 244 or the second conductive stub 245 may be electrically connected to the plurality of the conductive layers 530.

Figure 6:
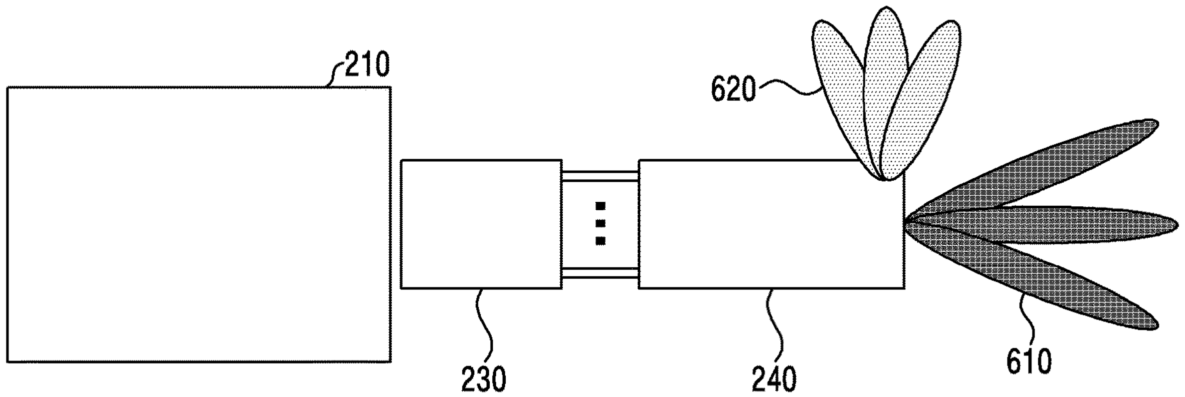
FIG. 6 illustrates a first antenna operating as an antenna radiator according to an operation of at least one processor according to an embodiment of the disclosure.

FIG. 6 illustrates an antenna array operating as an antenna radiator according to an operation of at least one processor according to an embodiment of the disclosure.

According to an embodiment of the disclosure, the antenna array may include a first antenna or a second antenna. For example, the first antenna or the second antenna may be substantially the same as the first antenna 240 of FIG. 3.

Referring to FIG. 6, the at least one processor 210 may adjust (or, control) a radiation pattern through the antenna array using the wireless communication circuit 230. A detailed description on the radiation pattern control through the antenna array shall be described in FIGS. 7 and 8.

According to an embodiment of the disclosure, the processor 210 may double-feed the first antenna or the second antenna included in the antenna array, and control the radiation pattern by adjusting the phase of the fed current.

According to an embodiment of the disclosure, the at least one processor 210 may control the antenna array to form a first radiation pattern 610 using the wireless communication circuit 230. In an example, the at least one processor 210 may control the first antenna 240 to form an end-fire mode radiation pattern. In another example, the at least one processor 210 may control the first antenna 240 to form a broad-side mode radiation pattern.

Figure 7:
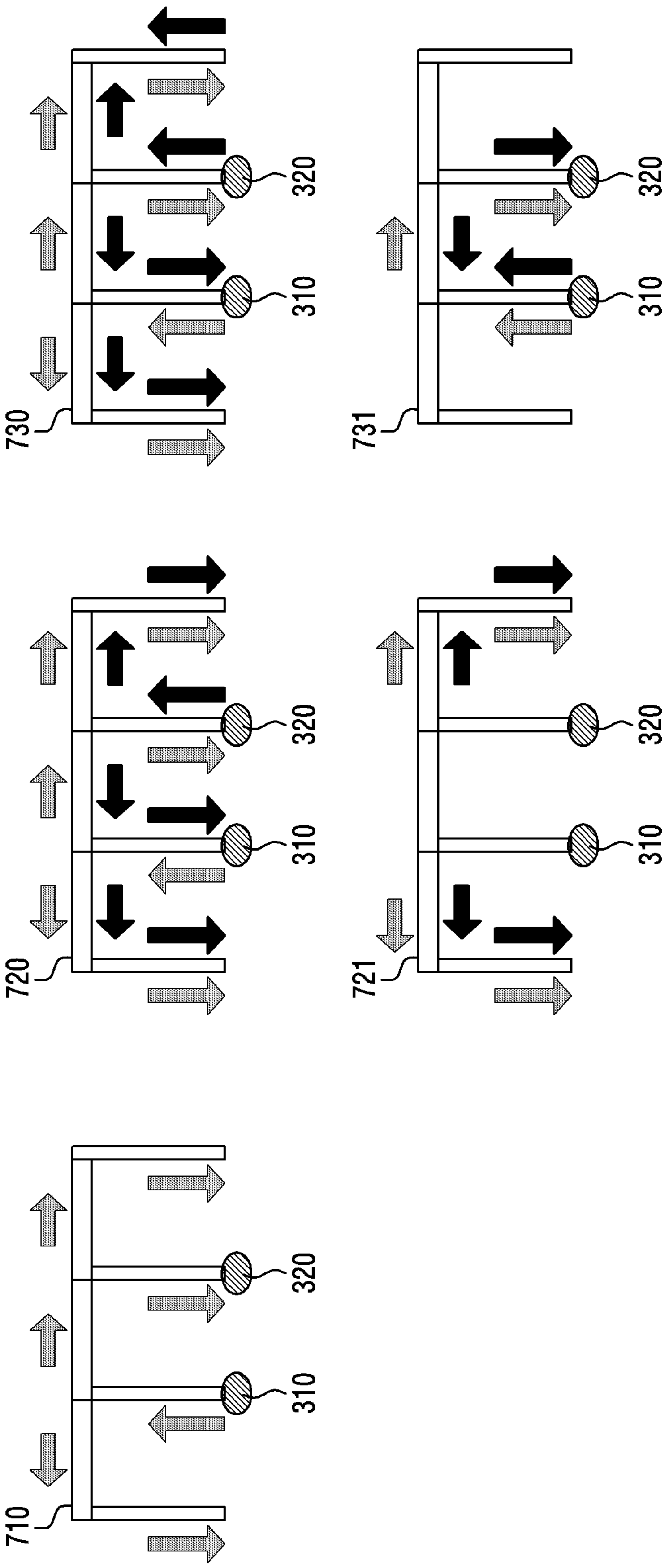
FIG. 7 illustrates current flows formed along a first antenna if power is supplied from a first point or a second point of a printed circuit board according to an embodiment of the disclosure.

FIG. 7 illustrates current flows formed along a first antenna if power is supplied at a first point or a second point of a PCB according to an embodiment of the disclosure.

Referring to FIG. 7, the wireless communication circuit 230 may supply power to the first antenna 240 through the first point 310 or the second point 320 of the PCB 220.

According to an embodiment of the disclosure, in case that the wireless communication circuit 230 supplies the power to the first point 310 and does not supply the power to the second point 320, the first antenna 240 may form the current flow as shown in a drawing 710.

According to an embodiment of the disclosure, in case that the wireless communication circuit 230 supplies the current having the same phase to the first point 310 and the second point 320, the first antenna 240 may form the current flow as shown in a drawing 720. In an example, the current flow formed in the first antenna 240 may be offset or overlapped at least in part to form an effective current flow as shown in a drawing 721.

According to an embodiment of the disclosure, in case that the wireless communication circuit 230 supplies the current having the phase difference of 180 degrees to the first point 310 and the second point 320, the first antenna 240 may form the current flow as shown in a drawing 730. In an example, the current flow formed in the first antenna 240 may be offset or overlapped at least in part to form an effective current flow as shown in a drawing 731.

Figure 8:
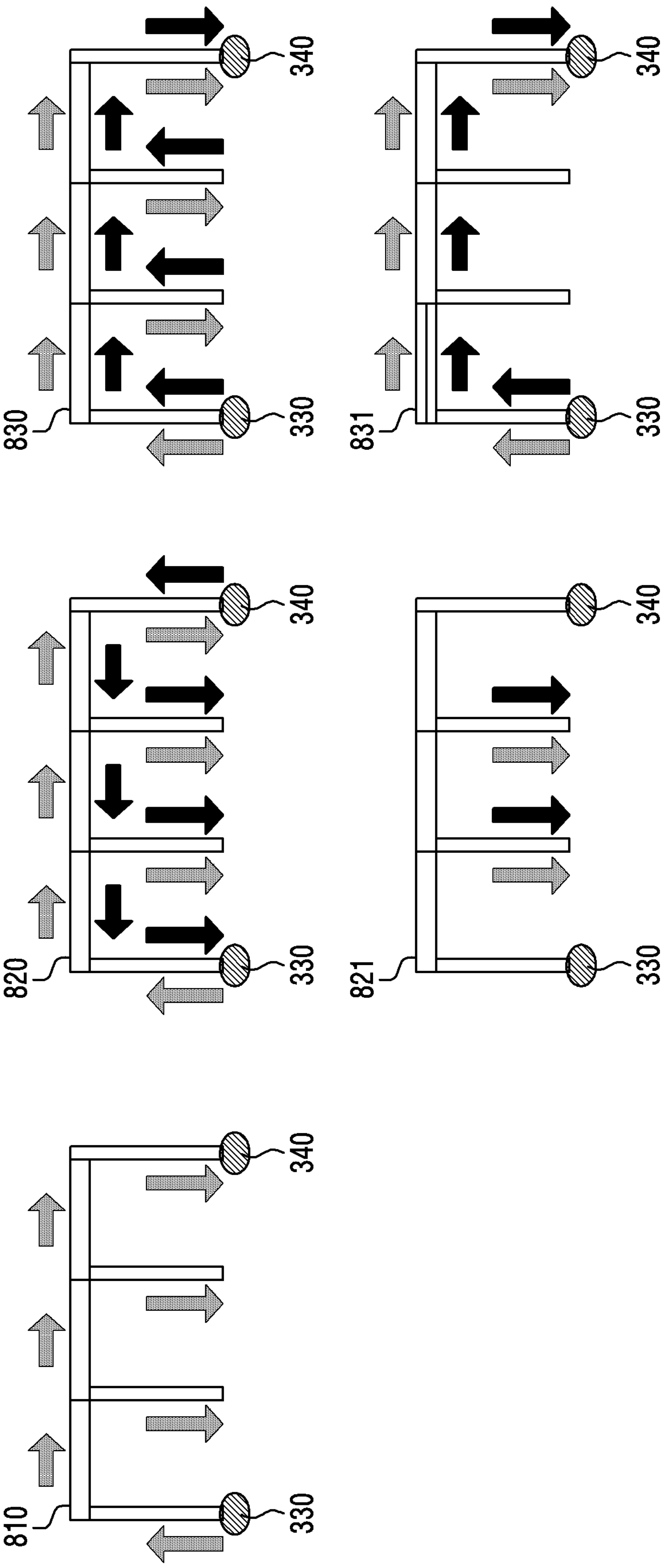
FIG. 8 illustrates current flows formed along a first antenna if power is supplied from a third point or a fourth point of a printed circuit board according to an embodiment of the disclosure.

FIG. 8 illustrates current flows formed along a first antenna in case that power is supplied from a third point or a fourth point of a PCB according to an embodiment of the disclosure.

Referring to FIG. 8, the wireless communication circuit 230 may supply power to the first antenna 240 through the third point 330 or the fourth point 340 of the PCB 220.

According to an embodiment of the disclosure, in case that the wireless communication circuit 230 supplies the power to the third point 330 and does not supply the power to the fourth point 340, the first antenna 240 may form the current flow as shown in a drawing 810.

According to an embodiment of the disclosure, in cast that the wireless communication circuit 230 supplies the current of the same phase to the third point 330 and the fourth point 340, the first antenna 240 may form the current flow as shown in a drawing 820. In an example, the current flow formed in the first antenna 240 may be offset or overlapped at least in part to form an effective current flow as shown in a drawing 821.

According to an embodiment of the disclosure, in case that the wireless communication circuit 230 supplies the current having the phase difference of 180 degrees to the third point 330 and the fourth point 340, the first antenna 240 may form the current flow as shown in a drawing 830. In an example, the current flow formed in the first antenna 240 may be offset or overlapped at least in part to form an effective current flow as shown in a drawing 831.

Figure 9:
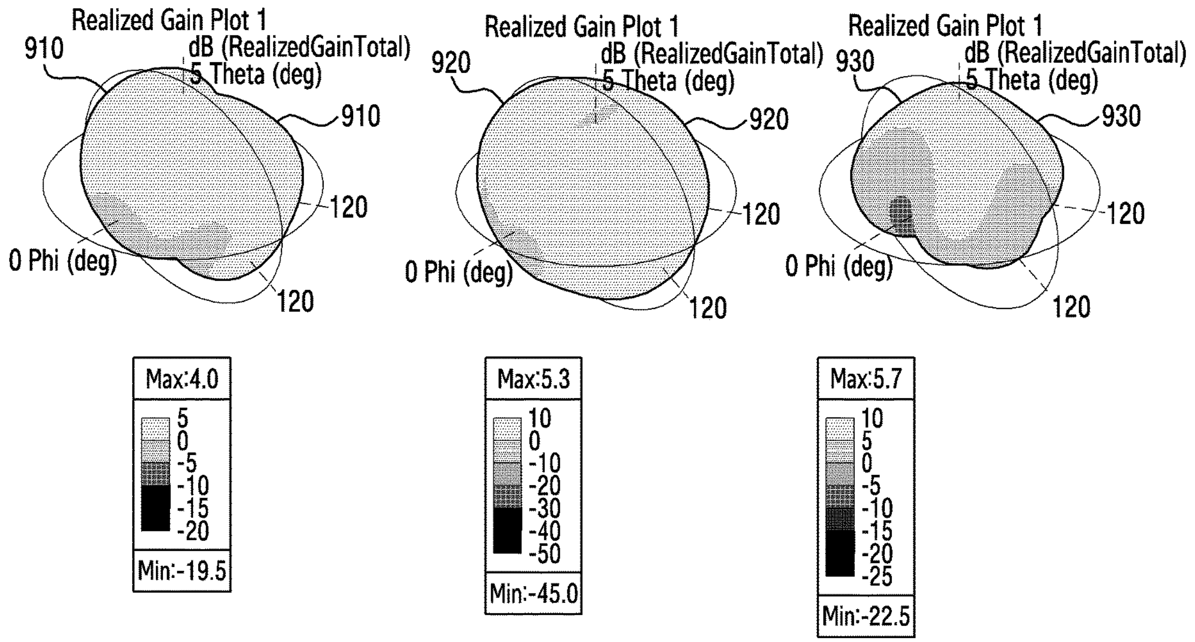
FIG. 9 illustrates radiation patterns of FIG. 7 according to an embodiment of the disclosure.

FIG. 9 illustrates radiation patterns of FIG. 7 according to an embodiment of the disclosure.

Referring to FIG. 9, different radiation patterns may be formed according to the current flow formed in the first antenna 240 in FIG. 7.

According to an embodiment of the disclosure, in case that the first antenna 240 forms the current flow as shown in the drawing 710, the first antenna 240 may form the radiation pattern such as a radiation pattern 910. In an example, the radiation pattern 910 may correspond to a fan-beam pattern.

According to an embodiment of the disclosure, in case that the first antenna 240 forms the effective current flow as shown in the drawing 721, the first antenna 240 may form the radiation pattern such as a radiation pattern 920. In an example, the radiation pattern 920 may correspond to an omni-direction pattern.

According to an embodiment of the disclosure, in case that the first antenna 240 forms the effective current flow as shown in the drawing 731, the first antenna 240 may form the radiation pattern such as a radiation pattern 930. In an example, the radiation pattern 930 may correspond to a broad-side pattern.

Figure 10:
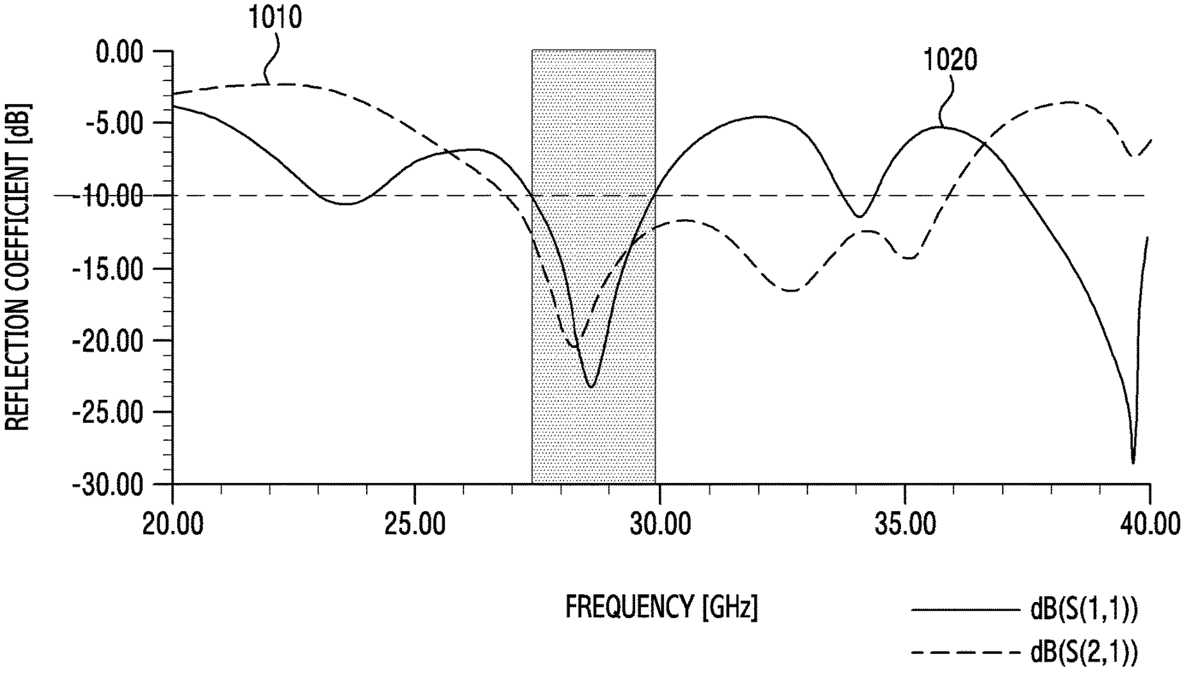
FIG. 10 is a graph illustrating a reflection coefficient and a S21 coefficient according to a current flow formed along a first antenna if power is supplied from a first point of a printed circuit board of FIG. 7 according to an embodiment of the disclosure.

FIG. 10 is a graph illustrating a reflection coefficient and a S21 coefficient according to a current flow formed along a first antenna in case that power is supplied from a first point of a PCB of FIG. 7 according to an embodiment of the disclosure.

Referring to FIG. 10, in case that the wireless communication circuit 230 supplies the power to the first antenna 240 through the first point 310 in FIG. 7, the first conductive stub 244 and the second conductive stub 245 may be formed in the first antenna 240 to improve isolation in a resonant frequency band.

According to an embodiment of the disclosure, in case that the wireless communication circuit 230 supplies the power to the first antenna 240 through the first point 310 in FIG. 7, a reflection coefficient graph 1010 may have a low value in the frequency band if the operating frequency band is matched to a frequency band of about 27 gigahertz (GHz) through about 30 GHz using the first conductive stub 244 and the second conductive stub 245. In an example, in case that the wireless communication circuit 230 supplies the power to the first antenna 240 through the first point 310, the first antenna 240 may obtain relatively good radiation efficiency in the frequency band of about 27 GHz through about 30 GHz.

According to an embodiment of the disclosure, in case that the wireless communication circuit 230 supplies the power to the first antenna 240 through the first point 310 in FIG. 7, an S21 coefficient graph (or, reflection coefficient graph) 1020 may have a low value in the frequency band in case that the operating frequency band is matched to the frequency band of about 27 GHz through about 30 GHz using the first conductive stub 244 and the second conductive stub 245. In an example, in case that the wireless communication circuit 230 supplies the power to the first antenna 240 through the first point 310, the first antenna 240 may obtain good radiation efficiency with a neighboring frequency band in the frequency band of about 27 GHz through about 30 GHz where the radiation efficiency is maximized (or, increased).

According to an embodiment of the disclosure, the resonant frequency band of the first antenna 240 may be controlled, by adjusting the length of the first conductive stub 244 or the second conductive stub 245 included in the first antenna 240. In an example, the resonant frequency band of the first antenna 240 may be lowered, by increasing the lengths of the first conductive stub 244 and the second conductive stub 245.

Figure 11:
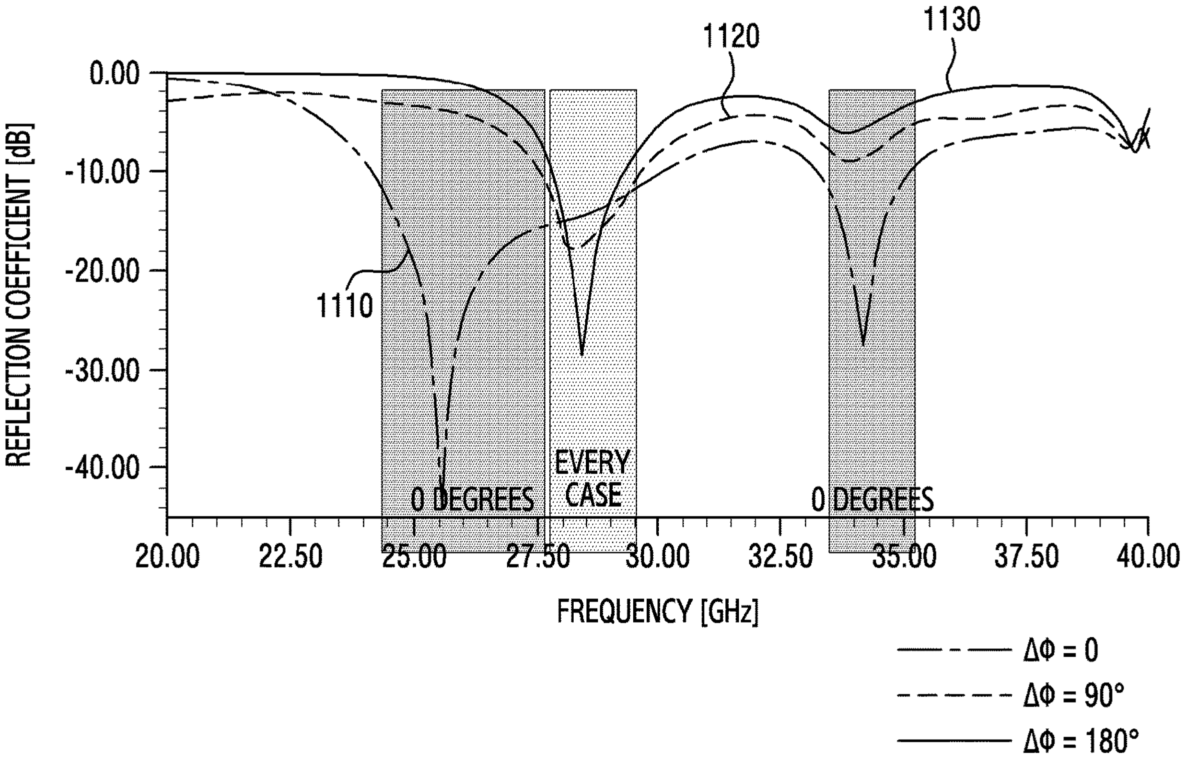
FIG. 11 is a graph illustrating a reflection coefficient according to a current flow formed along a first antenna if power is supplied from a first point and a second point of a printed circuit board of FIG. 7 according to an embodiment of the disclosure.

FIG. 11 is a graph illustrating a reflection coefficient according to a current flow formed along a first antenna if power is supplied from a first point and a second point of a PCB of FIG. 7 according to an embodiment of the disclosure.

Referring to FIG. 11, if the wireless communication circuit 230 supplies the power to the first antenna 240 through the first point 310 and the second point 320 in FIG. 7, the first conductive stub 244 and the second conductive stub 245 may be formed in the first antenna 240 to thus improve the radiation efficiency in different frequency bands 1110, 1120, and 1130.

According to an embodiment of the disclosure, the first antenna 240 may match the operating frequency band using the first conductive stub 244 and the second conductive stub 245. For example, the operating frequency band of the first antenna 240 may be matched to the frequency band of about 27.5 GHz through about 30 GHz.

According to an embodiment of the disclosure, if the wireless communication circuit 230 supplies the current of the same phase to the first point 310 and the second point 320 in FIG. 7, the first antenna 240 may maximize (or, increase) the radiation efficiency in a frequency band between about 24 GHz and about 27 GHz, and also resonate at about 33.5 GHz through about 35 GHz. In an example, in case that the wireless communication circuit 230 supplies the current having the phase difference of 90 degrees to the first point 310 and the second point 320 in FIG. 7, the first antenna 240 may resonate in a frequency band of about 27.5 GHz through about 30 GHz.

According to an embodiment of the disclosure, in case that the wireless communication circuit 230 supplies the current having the phase difference of 90 degrees to the first point 310 and the second point 320 in FIG. 7, the radiation efficiency may be maximized (or, increased) in the frequency band of about 27.5 GHz through about 30 GHz which is the operating frequency of the first antenna 240.

According to an embodiment of the disclosure, in case that the wireless communication circuit 230 supplies the current having the phase difference of 180 degrees to the first point 310 and the second point 320 in FIG. 7, the first antenna 240 may maximize (or, increase) the radiation efficiency in the frequency band of about 27.5 GHz through about 30 GHz.

Figure 12:
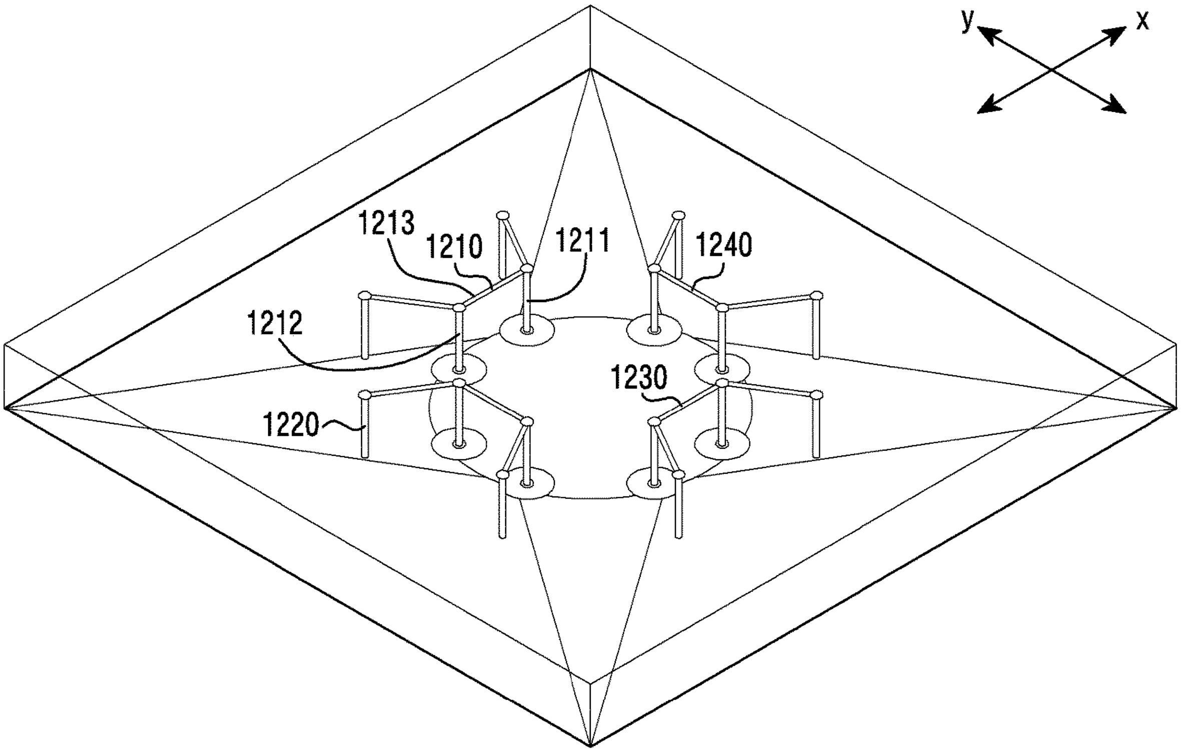
FIG. 12 is a perspective view illustrating a plurality of antennas disposed on a printed circuit board according to an embodiment of the disclosure.

FIG. 12 is a perspective view illustrating a plurality of antennas disposed on a PCB according to an embodiment of the disclosure.

Referring to FIG. 12, the first antenna 1210, the second antenna 1220, the third antenna 1230, and the fourth antenna 1240 may be disposed on the PCB 220.

According to an embodiment of the disclosure, the first antenna 1210, the second antenna 1220, the third antenna 1230, and the fourth antenna 1240 may be understood as substantially the same configuration as the first antenna 240 shown in FIG. 3. In an example, the first antenna 1220 may include a first conductive portion 1211 extending in a direction perpendicular to the first surface (e.g., the surface where the PCB 220 and the second antenna 1220 contact) of the PCB 220, a second conductive portion 1212 and a third conductive portion 1213 electrically connected to the first conductive portion 1211 and the second conductive portion 1212 and parallel to the PCB 220.

According to an embodiment of the disclosure, the first antenna 1210 and the third antenna 1230 may be formed to be symmetric based on a first virtual axis (e.g., the x axis of FIG. 12).

According to an embodiment of the disclosure, the second antenna 1220 and the fourth antenna 1240 may be formed to be symmetric based on a second virtual axis (e.g., they axis of FIG. 12).

Figure 13:
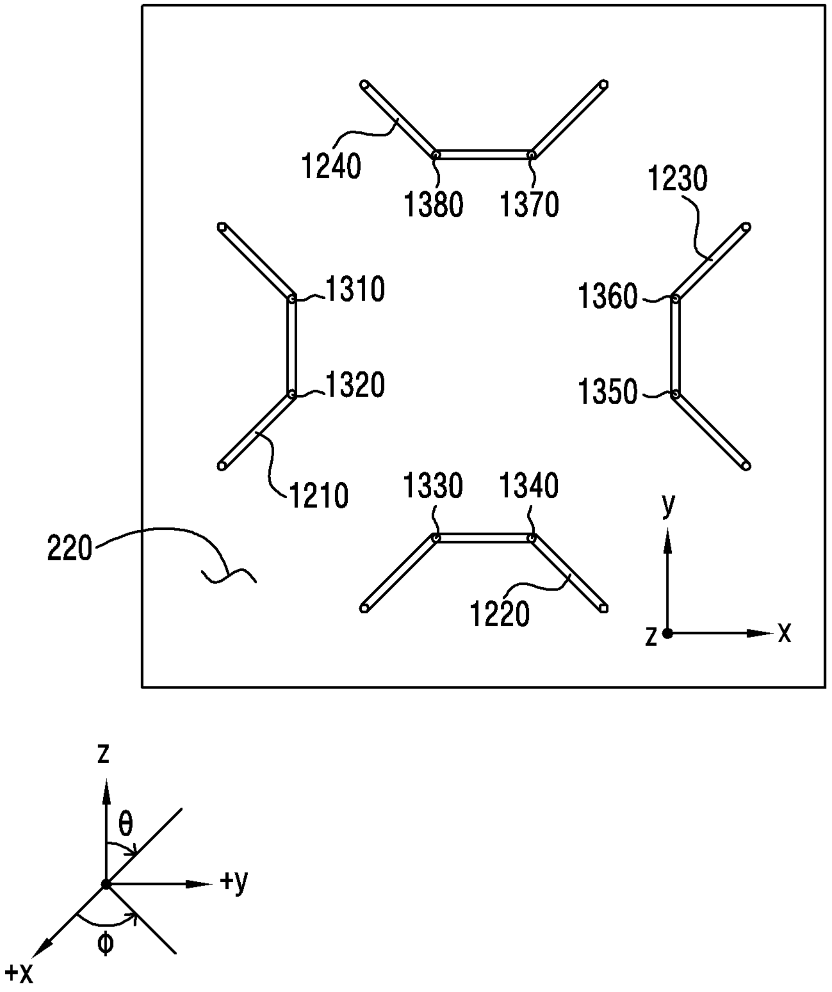
FIG. 13 is a front view illustrating a plurality of antennas disposed on a printed circuit board according to an embodiment of the disclosure.

FIG. 13 is a front view illustrating a plurality of antennas disposed on a PCB according to an embodiment of the disclosure.

Referring to FIG. 13, the wireless communication circuit 230 disposed on the PCB 220 may supply power to the plurality of the antennas 1210, 1220, 1230, and 1240 through at least one point of the PCB 220.

According to an embodiment of the disclosure, the wireless communication circuit 230 disposed on the PCB 220 may supply power to the first antenna 1210 through a first point 1310 or a second point 1320 of the PCB 220.

According to an embodiment of the disclosure, the wireless communication circuit 230 disposed on the PCB 220 may supply power to the second antenna 1220 through a third point 1330 or a fourth point 1340 of the PCB 220.

According to an embodiment of the disclosure, the wireless communication circuit 230 disposed on the PCB 220 may supply power to the third antenna 1230 through a fifth point 1350 or a sixth point 1360 of the PCB 220.

According to an embodiment of the disclosure, the wireless communication circuit 230 disposed on the PCB 220 may supply power to the fourth antenna 1240 through a seventh point 1370 or an eighth point 1380 of the PCB 220.

According to an embodiment of the disclosure, the at least one processor 210 may control the radiation pattern formed by the first antenna 1210 by adjusting (or, controlling) the magnitude or the phase of the current supplied by the wireless communication circuit 230 through the first point 1310 or the second point 1320.

According to an embodiment of the disclosure, the at least one processor 210 may control the radiation pattern formed by the second antenna 1220 by adjusting the magnitude or the phase of the current supplied by the wireless communication circuit 230 through the third point 1330 or the fourth point 1340.

According to an embodiment of the disclosure, the at least one processor 210 may control the radiation pattern formed by the third antenna 1230 by adjusting (or, controlling) the magnitude or the phase of the current supplied by the wireless communication circuit 230 through the fifth point 1350 or the sixth point 1360.

According to an embodiment of the disclosure, the at least one processor 210 may control the radiation pattern formed by the fourth antenna 1240 by adjusting (or, controlling) the magnitude or the phase of the current supplied by the wireless communication circuit 230 through the seventh point 1370 or the eighth point 1380.

According to an embodiment of the disclosure, the at least one processor 210 may control the radiation pattern formed by the first antenna 1210, the second antenna 1220, the third antenna 1230, and/or the fourth antenna 1240 by adjusting (or, controlling) the magnitude or the phase of the current supplied by the wireless communication circuit 230 through at least one point of the first point 1310, the second point 1320, the third point 1330, the fourth point 1340, the fifth point 1350, the sixth point 1360, the seventh point 1370, or the eighth point 1380. In an example, the at least one processor 210 may realize various radiation patterns by adjusting the radiation pattern formed by the first antenna 1210, the second antenna 1220, the third antenna 1230, and/or the fourth antenna 1240.

Figure 14:
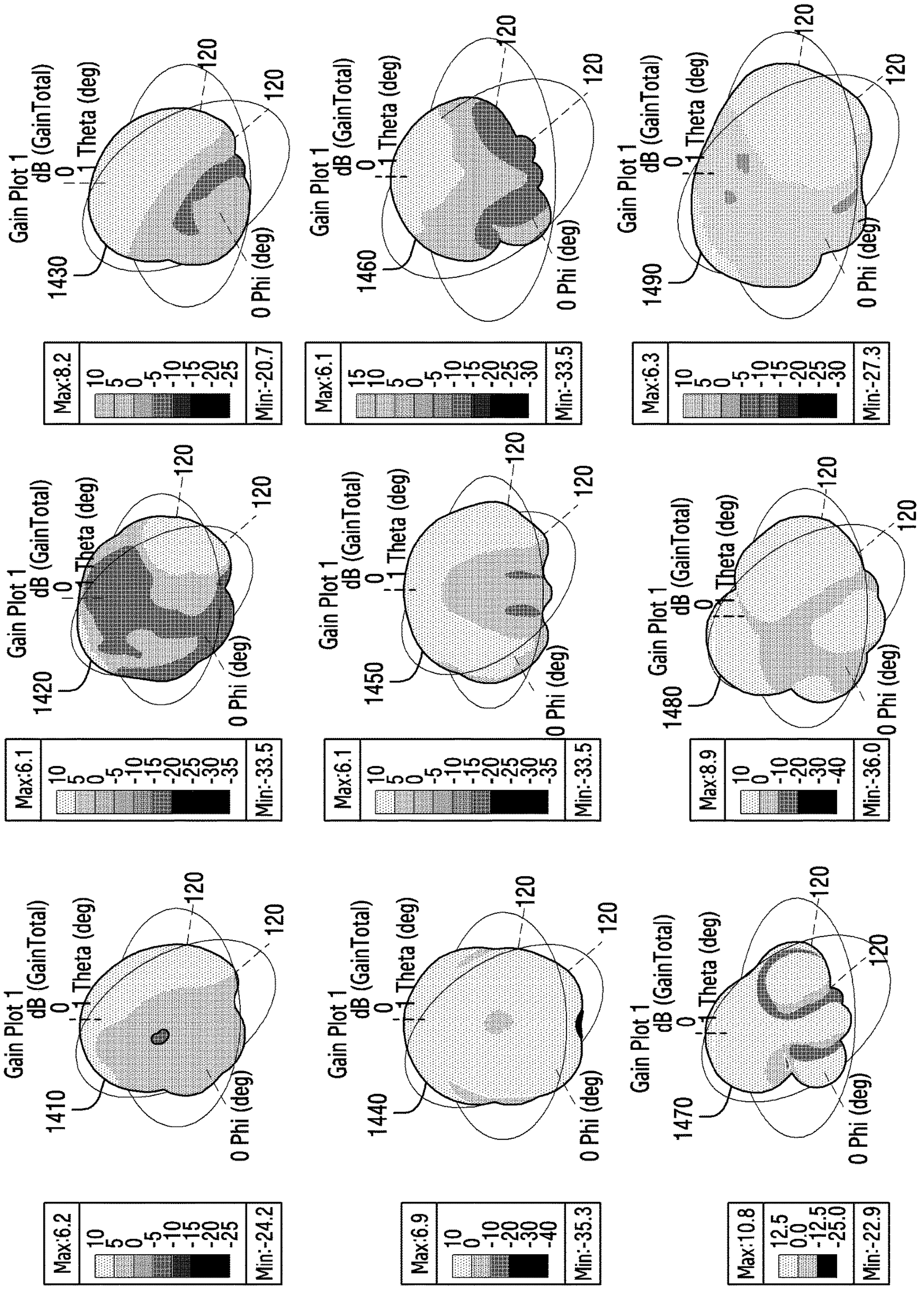
FIG. 14 illustrates radiation patterns of FIG. 13 according to an embodiment of the disclosure.

FIG. 14 illustrates radiation patterns of FIG. 13 according to an embodiment of the disclosure.

Referring to FIG. 14, various radiation patterns may be realized by adjusting the radiation patterns formed by the first antenna 1210, the second antenna 1220, the third antenna 1230, and the fourth antenna 1240. In an example, a peak gain point to be mentioned is described based on ($\varphi$, $\theta$) shown in FIG. 13.

According to an embodiment of the disclosure, in case that the wireless communication circuit 230 supplies the power to the first point 1310 and does not supply power to other points of the PCB 220, the electronic device 100 may form the radiation pattern such as a radiation pattern 1410.

According to an embodiment of the disclosure, in case that the wireless communication circuit 230 supplies the power to the first point 1310 and supplies no power to other points of the PCB 220 than the first point 1310, the electronic device 100 may form the radiation pattern such as the radiation pattern 1410. For example, the radiation pattern 1410 may form a first polarization, the peak gain may be about 6.2 decibel isotropic (dBi), and the peak gain point may be (120 degrees, 20 degrees), or (−120 degrees, 20 degrees). The first polarization may be, for example, V-pol.

According to an embodiment of the disclosure, n case that the wireless communication circuit 230 supplies the current of the same phase to the first point 1310 and the second point 1320 and does not supply power to other points than the first point 1310 and the second point 1320, the electronic device 100 may form the radiation pattern such as a radiation pattern 1420. For example, the radiation pattern 1420 may form a second polarization, the peak gain may be about 6.1 dBi, and the peak gain point may be (−90 degrees, 45 degrees). The second polarization may be, for example, V-pol.

According to an embodiment of the disclosure, in case that the wireless communication circuit 230 supplies the current having the phase difference of 180 degrees to the first point 1310 and the second point 1320 and does not supply power to other points of the PCB 220 than the first point 1310 and the second point 1320, the electronic device 100 may form the radiation pattern such as a radiation pattern 1430. For example, the radiation pattern 1430 may form a third polarization, the peak gain may be about 8.2 dBi, and the peak gain point may be (−90 degrees, 25 degrees). The third polarization may be, for example, X-pol.

According to an embodiment of the disclosure, in case that the wireless communication circuit 230 supplies the current of the same phase to the first point 1310 and the eighth point 1380 and does not supply power to other points of the PCB 220 than the first point 1310 and the eighth point 1380, the electronic device 100 may form the radiation pattern such as a radiation pattern 1440. For example, the radiation pattern 1440 may form a fourth polarization, the peak gain may be about 6.9 dBi, and the peak gain point may be (0 degrees, 0 degrees). The fourth polarization may be, for example, X-pol and V-pol.

According to an embodiment of the disclosure, in case that the wireless communication circuit 230 supplies the current having the phase difference of 180 degrees to the first point 1310 and the eighth point 1380 and does not supply power to other points of the PCB 220 than the first point 1310 and the eighth point 1380, the electronic device 100 may form the radiation pattern such as a radiation pattern 1450. For example, the radiation pattern 1450 may form a fifth polarization, the peak gain may be about 5.2 dBi, and the peak gain point may be (−120 degrees, −20 degrees). The fifth polarization may be, for example, dual-pol.

According to an embodiment of the disclosure, in case that the wireless communication circuit 230 supplies the current having the phase of 0 degrees to the first point 1310 and the sixth point 1360, supplies the current having the phase of 180 degrees to the second point 1320 and the fifth point 1350, and supplies no power to other points of the PCB 220 than the first point 1310, the second point 1320, the fifth point 1350, and the sixth point 1360, the electronic device 100 may form the radiation pattern such as a radiation pattern 1460. For example, the radiation pattern 1460 may form a sixth polarization, the peak gain may be about 11.0 dBi, and the peak gain point may be (0 degrees, 0 degrees). The sixth polarization may be, for example, X-pol.

According to an embodiment of the disclosure, in case that the wireless communication circuit 230 supplies the current having the phase of 0 degrees to the first point 1310, supplies the current having the phase of 180 degrees to the second point 1320, supplies the current having the phase of 270 degrees to the fifth point 1350, supplies the current having the phase of 90 degrees to the sixth point 1360, and supplies no power to other points of the PCB 220 than the first point 1310, the second point 1320, the fifth point 1350, and the sixth point 1360, the electronic device 100 may form the radiation pattern such as a radiation pattern 1470. For example, the radiation pattern 1470 may form a seventh polarization, the peak gain may be about 10.8 dBi, and the peak gain point may be (−90 degrees, 20 degrees). The seventh polarization may be, for example, X-pol.

According to an embodiment of the disclosure, in case that the wireless communication circuit 230 supplies the current having the phase of 0 degrees to the first point 1310 and the fifth point 1350, supplies the current having the phase of 180 degrees to the second point 1320 and the sixth point 1360, and supplies no power to other points of the PCB 220 than the first point 1310, the second point 1320, the fifth point 1350, and the sixth point 1360, the electronic device 100 may form the radiation pattern such as a radiation pattern 1480. For example, the radiation pattern 1480 may form an eighth polarization, the peak gain may be about 8.9 dBi, and the peak gain point may be (90 degrees, 35 degrees). The eighth polarization may be, for example, X-pol.

According to an embodiment of the disclosure, in case that the wireless communication circuit 230 supplies the current having the phase of 0 degrees to the first point 1310 and the second point 1320, supplies the current having the phase of 180 degrees to the fifth point 1350 and the sixth point 1360, and supplies no power to other point of the PCB 220 than the first point 1310, the second point 1320, the fifth point 1350, and the sixth point 1360, the electronic device 100 may form the radiation pattern such as a radiation pattern 1490. For example, the radiation pattern 1490 may form a ninth polarization, the peak gain may be about 6.3 dBi, and the peak gain point may be (90 degrees, 60 degrees) and (−90 degrees, −60 degrees). The ninth polarization may be, for example, V-pol.

Figure 15:
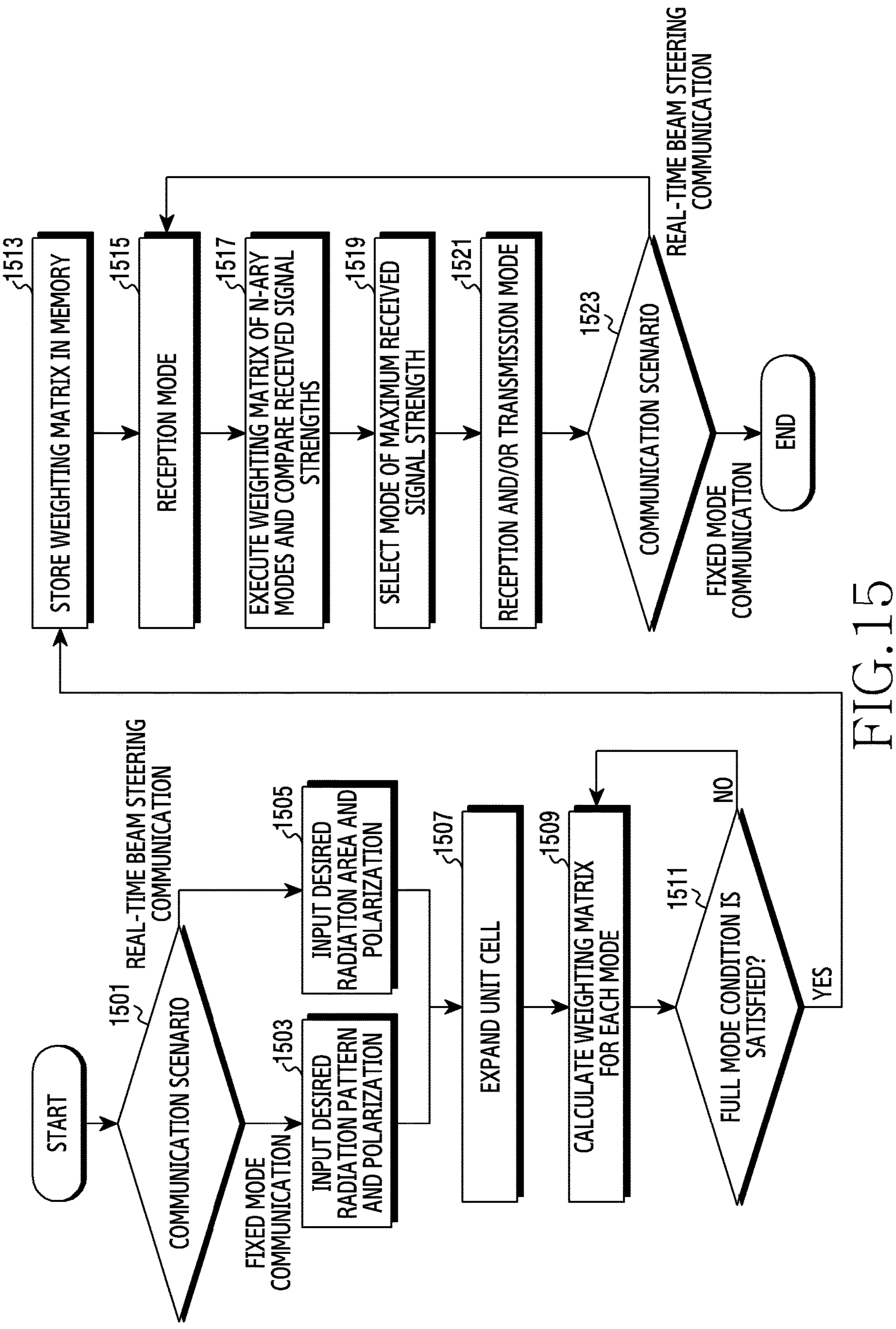
FIG. 15 is an operational flowchart of an electronic device according to an embodiment of the disclosure.

FIG. 15 is an operational flowchart of an electronic device according to an embodiment of the disclosure.

Referring to FIG. 15, the electronic device 100 may control a communication mode by adjusting the radiation pattern and the polarization according to a communication scenario.

According to an embodiment of the disclosure, in operation 1501, the electronic device 100 may determine whether the communication scenario is fixed mode communication or real-time beam steering communication.

According to an embodiment of the disclosure, in case that determining that the communication scenario is the fixed mode communication in operation 1501, the electronic device 100 may input a desired radiation pattern and polarization, in operation 1503.

According to an embodiment of the disclosure, in case that determining that the communication scenario is the real-time beam steering communication in operation 1501, the electronic device 100 may input a desired radiation area and polarization, in operation 1505.

According to an embodiment of the disclosure, in operation 1507, the electronic device 100 may expand a unit cell. In an example, the unit cell may indicate the first antenna 240.

According to an embodiment of the disclosure, in operation 1509, the electronic device 100 may calculate (or, identify) a weighting matrix for each mode. In an example, the weighting matrix may be calculated in consideration of sensitivity of a signal received by the electronic device 100.

TABLE 1

| | mode | | | | | | | |
|---|---|---|---|---|---|---|---|---|
| port | 1 | 2 | 3 | 4 | 5 | 6 | 7 | 8 |
| A | 0 | X | X | X | X | X | X | X |
| B | 0 | 0 | X | X | X | X | X | X |
| C | 0 | 180 | X | X | X | X | X | X |
| D | 0 | X | X | X | X | X | X | 0 |
| E | 0 | X | X | X | X | X | X | 180 |
| F | 0 | 180 | X | X | 180 | 0 | X | X |
| G | 0 | 180 | X | X | 270 | 90 | X | X |
| H | 0 | 180 | X | X | 0 | 180 | X | X |
| I | 0 | 0 | X | X | 180 | 180 | X | X |

According to an embodiment of the disclosure, Table 1 may indicate the weighting matrix. In an example, 0 may indicate that the power is supplied with the phase of 0 degrees, and 180 may indicate that the power is supplied with the phase of 180 degrees in the table. In another example, X may indicate that the power is not supplied.

According to an embodiment of the disclosure, in operation 1511, the electronic device 100 may determine whether a full mode condition is satisfied. In an example, the full mode condition may indicate that the power is supplied to all of a plurality of unit cells (e.g., a plurality of antennas).

According to an embodiment of the disclosure, in case that determining that the full mode condition is satisfied in operation 1511, the electronic device 100 may store the weighting matrix in operation 1513.

According to an embodiment of the disclosure, in case that determining that the full mode condition is not satisfied in operation 1511, the electronic device 100 may re-perform operation 1507.

According to an embodiment of the disclosure, in operation 1515, the electronic device 100 may set the reception mode. In an example, by setting the reception mode, the electronic device 100 may be configured to receive a signal transmitted by an external device.

According to an embodiment of the disclosure, in operation 1517, the electronic device 100 may execute a weighting matrix of N-ary modes and compare the received signal strength. In an example, the electronic device 100 may execute the weighting matrix of the N-ary modes by adjusting the intensity and the phase of the current supplied to the first antenna 240, and compare it with the received signal strength.

According to an embodiment of the disclosure, the weighting matrix of the N-ary modes may indicate a table representing the antenna radiation performance based on the radiation direction for each of the N modes.

According to an embodiment of the disclosure, in operation 1519, the electronic device 100 may select a mode in which the received signal strength is maximized (or, increased). In an example, the electronic device 100 may select a mode for forming the radiation pattern to maximize (or, increase) the received signal.

According to an embodiment of the disclosure, in operation 1521, the electronic device 100 may be configured to receive and/or transmit. In an example, the electronic device 100 may be configured to transmit a signal to an external device using the first antenna 240 in addition to receiving a signal.

According to an embodiment of the disclosure, in operation 1523, the electronic device 100 may re-determine whether the communication scenario is the fixed mode communication or the real-time beam steering communication.

The order of the operations of the FIG. 15 is only an example, and the operations of FIG. 15 may be performed in parallel or in a different order.

Figure 16:
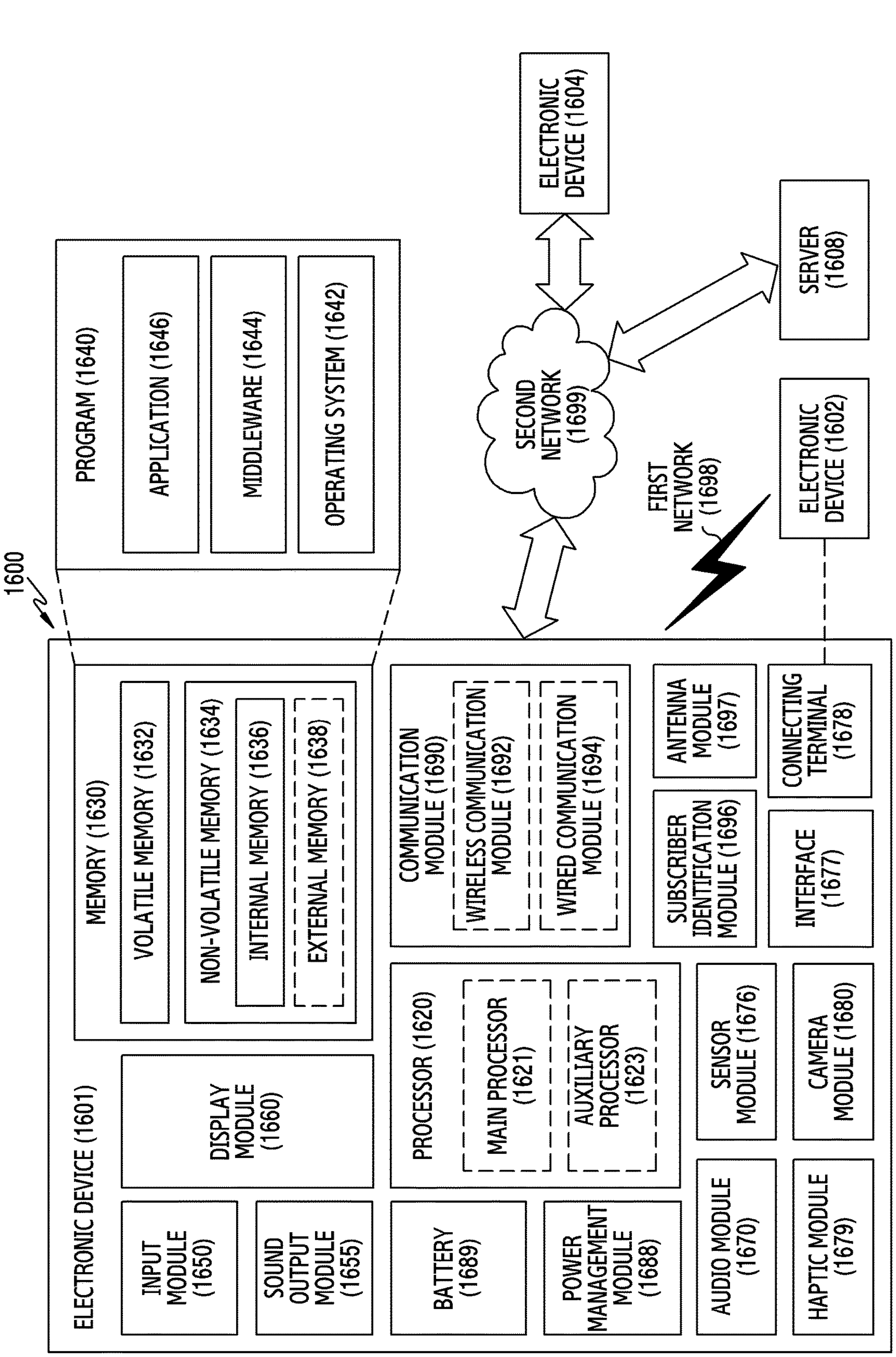
FIG. 16 is a block diagram of an electronic device in a network environment according to an embodiment of the disclosure.

FIG. 16 is a block diagram illustrating an electronic device in a network environment according to an embodiment of the disclosure.

Referring to FIG. 16, an electronic device 1601 in a network environment 1600 may communicate with an external electronic device 1602 via a first network 1698 (e.g., a short-range wireless communication network), or at least one of an external electronic device 1604 or a server 1608 via a second network 1699 (e.g., a long-range wireless communication network). According to an embodiment of the disclosure, the electronic device 1601 may communicate with the external electronic device 1604 via the server 1608. According to an embodiment of the disclosure, the electronic device 1601 may include a processor 1620, a memory 1630, an input module 1650, a sound output module 1655, a display module 1660, an audio module 1670, a sensor module 1676, an interface 1677, a connecting terminal 1678, a haptic module 1679, a camera module 1680, a power management module 1688, a battery 1689, a communication module 1690, a subscriber identification module (SIM) 1696, or an antenna module 1697. In some embodiments of the disclosure, at least one of the components (e.g., the connecting terminal 1678) may be omitted from the electronic device 1601, or one or more other components may be added in the electronic device 1601. In some embodiments of the disclosure, some of the components (e.g., the sensor module 1676, the camera module 1680, or the antenna module 1697) may be implemented as a single component (e.g., the display module 1660).

The processor 1620 may execute, for example, software (e.g., a program 1640) to control at least one other component (e.g., a hardware or software component) of the electronic device 1601 coupled with the processor 1620, and may perform various data processing or computation. According to one embodiment of the disclosure, as at least part of the data processing or computation, the processor 1620 may store a command or data received from another component (e.g., the sensor module 1676 or the communication module 1690) in a volatile memory 1632, process the command or the data stored in the volatile memory 1632, and store resulting data in a non-volatile memory 1634. According to an embodiment of the disclosure, the processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with, the main processor 1621. For example, when the electronic device 1601 includes the main processor 1621 and the auxiliary processor 1623, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display module 1660, the sensor module 1676, or the communication module 1690) among the components of the electronic device 1601, instead of the main processor 1621 while the main processor 1621 is in an inactive (e.g., a sleep)

state, or together with the main processor 1621 while the main processor 1621 is in an active state (e.g., executing an application). According to an embodiment of the disclosure, the auxiliary processor 1623 (e.g., an image signal processor or a communication processor) may be implemented as part of another component (e.g., the camera module 1680 or the communication module 1690) functionally related to the auxiliary processor 1623. According to an embodiment of the disclosure, the auxiliary processor 1623 (e.g., the neural processing unit) may include a hardware structure specified for artificial intelligence model processing. An artificial intelligence model may be generated by machine learning. Such learning may be performed, e.g., by the electronic device 1601 where the artificial intelligence is performed or via a separate server (e.g., the server 1608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input module 1650 may receive a command or data to be used by another component (e.g., the processor 1620) of the electronic device 1601, from the outside (e.g., a user) of the electronic device 1601. The input module 1650 may include, for example, a microphone, a mouse, a keyboard, a key (e.g., a button), or a digital pen (e.g., a stylus pen).

The sound output module 1655 may output sound signals to the outside of the electronic device 1601. The sound output module 1655 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 1660 may visually provide information to the outside (e.g., a user) of the electronic device 1601. The display module 1660 may include, for example, a display, a hologram device, or a projector and control circuitry to control a corresponding one of the display, hologram device, and projector. According to an embodiment of the disclosure, the display module 1660 may include a touch sensor adapted to detect a touch, or a pressure sensor adapted to measure the intensity of force incurred by the touch.

The audio module 1670 may convert a sound into an electrical signal and vice versa. According to an embodiment of the disclosure, the audio module 1670 may obtain the sound via the input module 1650, or output the sound via the sound output module 1655 or a headphone of an external electronic device (e.g., the external electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment of the disclosure, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the external electronic device 1602) directly (e.g., wiredly) or wirelessly. According to an embodiment of the disclosure, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the external electronic device 1602). According to an embodiment of the disclosure, the connecting terminal 1678 may include, for example, an HDMI connector, a USB connector, an SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1679 may include, for example, a motor, a piezoelectric element, or an electric stimulator.

The camera module 1680 may capture a still image or moving images. According to an embodiment of the disclosure, the camera module 1680 may include one or more lenses, image sensors, image signal processors, or flashes.

The power management module 1688 may manage power supplied to the electronic device 1601. According to one embodiment of the disclosure, the power management module 1688 may be implemented as at least part of, for example, a power management integrated circuit (PMIC).

The battery 1689 may supply power to at least one component of the electronic device 1601. According to an embodiment of the disclosure, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the external electronic device 1602, the external electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment of the disclosure, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, wireless-fidelity (Wi-Fi) direct, or infrared data association (IrDA)) or the second network 1699 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The wireless communication module 1692 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., the millimeter-wave (mmWave) band) to achieve, e.g., a high data transmission rate. The wireless communication module 1692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1692 may support various requirements specified in the electronic device 1601, an external electronic device (e.g., the external electronic device 1604), or a network system (e.g., the second network 1699). According to an embodiment of the disclosure, the wireless communication module 1692 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 1697 may transmit or receive a signal or power to or from the outside (e.g., the external electronic device) of the electronic device 1601. According to an embodiment of the disclosure, the antenna module 1697 may include an antenna including a radiating element composed of a conductive material or a conductive pattern formed in or on a substrate (e.g., a printed circuit board (PCB)). According to an embodiment of the disclosure, the antenna module 1697 may include a plurality of antennas (e.g., array antennas). In such a case, at least one antenna appropriate for a communication scheme used in the communication network, such as the first network 1698 or the second network 1699, may be selected, for example, by the communication module 1690 (e.g., the wireless communication module 1692) from the plurality of antennas. The signal or the power may then be transmitted or received between the communication module 1690 and the external electronic device via the selected at least one antenna. According to an embodiment of the disclosure, another component (e.g., a radio frequency integrated circuit (RFIC)) other than the radiating element may be additionally formed as part of the antenna module 1697.

According to various embodiments of the disclosure, the antenna module 1697 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1601 and the external electronic device 1604 via the server 1608 coupled with the second network 1699. Each of the external electronic devices 1602 or 1604 may be a device of a same type as, or a different type, from the electronic device 1601. According to an embodiment of the disclosure, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, mobile edge computing (MEC), or client-server computing technology may be used, for example. The electronic device 1601 may provide ultra low-latency services using, e.g., distributed computing or mobile edge computing. In another embodiment of the disclosure, the external electronic device 1604 may include an internet-of-things (IoT) device. The server 1608 may be an intelligent server using machine learning and/or a neural network. According to an embodiment of the disclosure, the external electronic device 1604 or the server 1608 may be included in the second network 1699. The electronic device 1601 may be applied to intelligent services (e.g., a smart home, a smart city, a smart car, or healthcare) based on 5G communication technology or IoT-related technology.

An electronic device 100 according to various embodiments of the disclosure, may include a printed circuit board 200, a wireless communication circuit 230 disposed on the printed circuit board 220, a plurality of antennas, and at least one processor 210 electrically connected to the wireless communication circuit 210 and the plurality of the antennas, a first antenna 240 among the plurality of the antennas may include a first conductive portion 241 extending from a first point of the printed circuit board 220 to face a first direction perpendicular to a first surface of the printed circuit board 220, a second conductive portion 242 extending from a second point of the printed circuit board 220 to face the first direction, a third conductive portion 243 parallel to the printed circuit board 220, a first conductive stub 244 including a first portion extending in a direction parallel to the printed circuit board 220 at a designated angle with the third conductive portion 243 at a first end of the third conductive portion 243 contacting the first conductive portion 241 and a portion bending at one end of the first portion and extending to a third point of the printed circuit board 220, and a second conductive stub 245 including a second portion extending in a direction parallel to the printed circuit board 220 at a designated angle with the third conductive portion 243 at a second end of the third conductive portion 243 contacting the second conductive portion 242 and a portion bending at one end of the second portion and extending to a fourth point of the printed circuit board 220, the third conductive portion 243 may be electrically connected to the first conductive portion 241 and the second conductive portion 242, and the wireless communication circuit 230 may supply power to the first antenna 240 through at least one point of the first point or the second point of the printed circuit board 220.

According to an embodiment of the disclosure, the at least one processor may control a radiation pattern formed by the plurality of the antennas, by adjusting a phase of a current supplied to the first point or the second point.

According to an embodiment of the disclosure, the at least one processor may control the wireless communication circuit to supply a current having the same phase to the first point and the second point.

According to an embodiment of the disclosure, the at least one processor may control to supply the current having a phase difference of 180 degrees to the first point and the second point.

According to an embodiment of the disclosure, the at least one processor may control a radiation pattern formed by the plurality of the antennas, by adjusting a magnitude of the current supplied to the first point or the second point.

According to an embodiment of the disclosure, the portion bending at the one end of the first portion of the first conductive stub and extending to the third point of the printed circuit board may be perpendicular to the first surface of the printed circuit board, and the portion bending at the one end of the second portion of the second conductive stub and extending to the fourth point of the printed circuit board may be perpendicular to the first surface of the printed circuit board.

According to an embodiment of the disclosure, an angle formed by the first conductive stub and the third conductive portion may be 45 degrees, and an angle formed by the second conductive stub and the third conductive portion may be 45 degrees.

According to an embodiment of the disclosure, the first conductive portion, the second conductive portion, or the third conductive portion may be a wire or a transmission circuit formed of a conductive material.

According to an embodiment of the disclosure, a resonant frequency band of the first antenna may be controlled by adjusting a length of the first conductive stub or the second conductive stub.

An electronic device according to various embodiments of the disclosure may include a printed circuit board, a wireless communication circuit disposed on the printed circuit board, a plurality of antennas, and at least one processor electrically connected to the wireless communication circuit and the plurality of the antennas, a first antenna among the plurality of the antennas may include a first conductive stub extending from a first point of the printed circuit board to face a first direction perpendicular to a first surface of the printed circuit board, a second conductive stub extending from a second point of the printed circuit board to face the first direction, a third conductive portion parallel to the printed circuit board, a first conductive stub including a first portion extending in a direction parallel to the printed circuit board at a designated angle with the third conductive portion at a first end of the third conductive portion contacting the first conductive portion and a portion bending at one end of the first portion and extending to a third point of the printed circuit board, and a second conductive stub including a second portion extending in a direction parallel to the printed circuit board at a designated angle with the third conductive portion at a second end of the third conductive portion contacting the second conductive portion and a portion bending at one end of the second portion and extending to a fourth point of the printed circuit board, the third conductive portion may be electrically connected to the first conductive stub and the second conductive stub, and the wireless communication circuit may supply power to the first antenna through at least one point of the third point or the fourth point of the printed circuit board.

According to an embodiment of the disclosure, the at least one processor may control a radiation pattern formed by the plurality of the antennas, by adjusting a phase of a current supplied to the third point or the fourth point.

According to an embodiment of the disclosure, the at least one processor may control the wireless communication circuit to supply a current having the same phase to the third point and the fourth point.

According to an embodiment of the disclosure, the at least one processor may control to supply a current having a phase difference of 180 degrees to the third point and the fourth point.

According to an embodiment of the disclosure, the at least one processor may control a radiation pattern formed by the plurality of the antennas, by adjusting a magnitude of a current supplied to the third point or the fourth point.

An electronic device according to various embodiments of the disclosure may include a printed circuit board, a wireless communication circuit disposed on the printed circuit board, a plurality of antennas including a first antenna, a second antenna, a third antenna, and a fourth antenna, and at least one processor electrically connected to the wireless communication circuit and the plurality of the antennas, the first antenna and the second antenna may be symmetric based on a virtual first axis, the third antenna and the fourth antenna may be symmetric based on a virtual second axis which is perpendicular to the first axis, the first antenna among the plurality of the antennas may include a first conductive portion extending from a first point of the printed circuit board and facing a first direction perpendicular to a first surface of the printed circuit board, a second conductive portion extending from a second point of the printed circuit board and facing the first direction, a third conductive portion parallel to the printed circuit board, a first conductive stub including a first portion extending in a direction parallel to the printed circuit board at a designated angle with the third conductive portion at a first end of the third conductive portion contacting the first conductive portion and a portion bending at one end of the first portion and extending to a third point of the printed circuit board, and a second conductive stub including a second portion extending in a direction parallel to the printed circuit board at a designated angle with the third conductive portion at a second end of the third conductive portion contacting the second conductive portion and a portion bending at one end of the second portion and extending to a fourth point of the printed circuit board, the third conductive portion may be electrically connected to the first conductive portion and the second conductive portion, the second antenna, the third antenna, and the fourth antenna may be formed in the same structure as the first antenna, and the wireless communication circuit may supply power to at least one antenna of the first antenna, the second antenna, the third antenna, and the fourth antenna through at least one point of the first point or the second point of the printed circuit board.

According to an embodiment of the disclosure, the at least one processor may control a radiation pattern formed by the plurality of the antennas, by adjusting a phase of a current supplied to at least one antenna of the first antenna, the second antenna, the third antenna, and the fourth antenna.

According to an embodiment of the disclosure, the at least one processor may control a radiation pattern formed by the plurality of the antennas, by adjusting a magnitude of a current supplied to one point of the printed circuit board.

According to an embodiment of the disclosure, an angle formed by the first conductive stub and the third conductive portion may be 45 degrees, and an angle formed by the second conductive stub and the third conductive portion may be 45 degrees.

According to an embodiment of the disclosure, the first conductive portion, the second conductive portion, or the third conductive portion may be a wire or a transmission circuit formed of a conductive material.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, of the disclosure the module may be implemented in a form of an application-specific integrated circuit (ASIC).

Various embodiments as set forth herein may be implemented as software (e.g., the program 1640) including one or more instructions that are stored in a storage medium (e.g., an internal memory 1636 or an external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a printed circuit board;
a wireless communication circuit disposed on the printed circuit board;
a plurality of antennas; and
at least one processor electrically connected to the wireless communication circuit and the plurality of the antennas,
wherein a first antenna among the plurality of the antennas comprises:
a first conductive portion extending from a first point of the printed circuit board to face a first direction perpendicular to a first surface of the printed circuit board,
a second conductive portion extending from a second point of the printed circuit board and to face the first direction,
a third conductive portion parallel to the printed circuit board, the third conductive portion electrically connected to the first conductive portion and the second conductive portion,
a first conductive stub comprising a first portion extending in a direction parallel to the printed circuit board at a designated angle with the third conductive portion at a first end of the third conductive portion contacting the first conductive portion and a portion bending at one end of the first portion and extending to a third point of the printed circuit board, and
a second conductive stub comprising a second portion extending in a direction parallel to the printed circuit board at a designated angle with the third conductive portion at a second end of the third conductive portion contacting the second conductive portion and a portion bending at one end of the second portion and extending to a fourth point of the printed circuit board, and
wherein the wireless communication circuit adjusts a radiation pattern of the first antenna by supplying power to the first antenna through at least one point of the first point and the second point of the printed circuit board, in conformity with a weighting matrix calculated based on a communication scenario.

2. The electronic device of claim 1, wherein the at least one processor is configured to control a radiation pattern formed by the plurality of the antennas, by adjusting a phase of a current supplied to the first point or the second point.

3. The electronic device of claim 2, wherein the at least one processor is further configured to control the wireless communication circuit to supply a current having a same phase to the first point and the second point.

4. The electronic device of claim 2, wherein the at least one processor is further configured to control to supply the current having a phase difference of 180 degrees to the first point and the second point.

5. The electronic device of claim 2, wherein the at least one processor is further configured to control a radiation pattern formed by the plurality of the antennas, by adjusting a magnitude of the current supplied to the first point or the second point.

6. The electronic device of claim 1,
wherein the portion bending at the one end of the first portion of the first conductive stub and extending to the third point of the printed circuit board is perpendicular to the first surface of the printed circuit board, and
wherein the portion bending at the one end of the second portion of the second conductive stub and extending to the fourth point of the printed circuit board is perpendicular to the first surface of the printed circuit board.

7. The electronic device of claim 1, wherein an angle formed by the first conductive stub and the third conductive portion is 45 degrees, and an angle formed by the second conductive stub and the third conductive portion is 45 degrees.

8. The electronic device of claim 1, wherein the first conductive portion, the second conductive portion, or the third conductive portion is a wire or a transmission circuit formed of a conductive material.

9. The electronic device of claim 1, wherein a resonant frequency band of the first antenna is controlled by adjusting a length of the first conductive stub or the second conductive stub.

10. The electronic device of claim 1, wherein the wireless communication circuit supplies the power to the first antenna through the first point and the second point of the printed circuit board.

11. An electronic device comprising:
a printed circuit board;
a wireless communication circuit disposed on the printed circuit board;
a plurality of antennas; and
at least one processor electrically connected to the wireless communication circuit and the plurality of the antennas,
wherein a first antenna among the plurality of the antennas comprises:
a first conductive portion extending from a first point of the printed circuit board and facing a first direction perpendicular to a first surface of the printed circuit board,
a second conductive portion extending from a second point of the printed circuit board and facing the first direction,
a third conductive portion parallel to the printed circuit board, the third conductive portion electrically connected to the first conductive portion and the second conductive portion,
a first conductive stub comprising a first portion extending in a direction parallel to the printed circuit board at a designated angle with the third conductive portion at a first end of the third conductive portion contacting the first conductive portion and a portion bending at one end of the first portion and extending to a third point of the printed circuit board, and
a second conductive stub comprising a second portion extending in a direction parallel to the printed circuit board at a designated angle with the third conductive portion at a second end of the third conductive portion contacting the second conductive portion and a portion bending at one end of the second portion and extending to a fourth point of the printed circuit board, and
wherein the wireless communication circuit adjusts a radiation pattern of the first antenna by supplying power to the first antenna through at least one point of the third point and the fourth point of the printed circuit board, in conformity with a weighting matrix calculated based on a communication scenario.

12. The electronic device of claim 11, wherein the at least one processor is further configured to control a radiation pattern formed by the plurality of the antennas, by adjusting a phase of a current supplied to the third point or the fourth point.

13. The electronic device of claim 11, wherein the at least one processor is further configured to control the wireless communication circuit to supply a current having a same phase to the third point and the fourth point.

14. The electronic device of claim 11, wherein the at least one processor is further configured to control to supply a current having a phase difference of 180 degrees to the third point and the fourth point.

15. The electronic device of claim 11, wherein the at least one processor is further configured to control a radiation pattern formed by the plurality of the antennas, by adjusting a magnitude of a current supplied to the third point or the fourth point.

16. The electronic device of claim 11, wherein the portion bending at the one end of the first portion of the first conductive stub and extending to the third point of the printed circuit board is perpendicular to the first surface of the printed circuit board, and wherein the portion bending at the one end of the second portion of the second conductive stub and extending to the fourth point of the printed circuit board is perpendicular to the first surface of the printed circuit board.

17. The electronic device of claim 11, wherein an angle formed by the first conductive stub and the third conductive portion is 45 degrees, and an angle formed by the second conductive stub and the third conductive portion is 45 degrees.

18. The electronic device of claim 11, wherein the first conductive portion, the second conductive portion, or the third conductive portion is a wire or a transmission circuit formed of a conductive material.

19. The electronic device of claim 11, wherein a resonant frequency band of the first antenna is controlled by adjusting a length of the first conductive stub or the second conductive stub.

20. The electronic device of claim 11, wherein the wireless communication circuit supplies the power to the first antenna through the first point and the second point of the printed circuit board.

* * * * *